(12) United States Patent
Luke et al.

(10) Patent No.: US 11,397,980 B1
(45) Date of Patent: Jul. 26, 2022

(54) METHOD AND SYSTEM FOR INTEGRATED SEARCH AND SELECTION IN A TRANSACTIONAL INTERFACE

(71) Applicant: City Electric Supply Company, Dallas, TX (US)

(72) Inventors: Jonathan Luke, Plano, TX (US); Russell Mendola, Cedar Hill, TX (US); Michael Flanagan, Grand Prairie, TX (US); Matthew Chappel, Cedar Hill, TX (US); James Barry, Plano, TX (US); Walter Sturghill, Garland, TX (US)

(73) Assignee: CITY ELECTRIC SUPPLY COMPANY, Dallas, TX (US)

( * ) Notice: Subject to any disclaimer, the term of this patent is extended or adjusted under 35 U.S.C. 154(b) by 609 days.

(21) Appl. No.: 16/230,483

(22) Filed: Dec. 21, 2018

(51) Int. Cl.
| G06F 16/00 | (2019.01) |
| G06Q 30/06 | (2012.01) |
| G06F 3/0482 | (2013.01) |
| G06F 16/538 | (2019.01) |
| G06F 16/9538 | (2019.01) |

(52) U.S. Cl.
CPC ....... *G06Q 30/0641* (2013.01); *G06F 3/0482* (2013.01); *G06F 16/538* (2019.01); *G06F 16/9538* (2019.01)

(58) Field of Classification Search
CPC . G06Q 30/0641; G06F 16/538; G06F 3/0482; G06F 16/9538; G06F 16/13; G06F 16/22; G06F 16/31; G06F 16/35; G06F 16/51; G06F 16/61; G06F 16/71; G06F 16/958
See application file for complete search history.

(56) References Cited

U.S. PATENT DOCUMENTS

| 5,715,314 | A | 2/1998 | Payne et al. |
| 5,909,492 | A | 6/1999 | Payne et al. |
| 6,101,482 | A | 8/2000 | DiAngelo et al. |
| 7,272,639 | B1 | 9/2007 | Levergood et al. |
| 7,558,793 | B1* | 7/2009 | Topolovac ......... G06Q 10/0875 |
| | | | 707/999.009 |
| 8,190,493 | B2 | 5/2012 | Saarinen et al. |
| 10,097,583 | B1* | 10/2018 | Demirjian ............... H04L 63/08 |
| 10,423,775 | B1* | 9/2019 | Kane-Parry ............ G06F 21/46 |
| 10,438,225 | B1* | 10/2019 | Reading ............ G06Q 30/0225 |
| 2005/0234860 | A1* | 10/2005 | Roever .................. G06Q 30/06 |

(Continued)

*Primary Examiner* — Noosha Arjomandi

(57) ABSTRACT

A method, computer program product, and system are disclosed. The method includes receiving a first communication at a computer system, performing a search operation, sending a second communication, receiving a third communication, and storing the at least the portion of item information in a transaction storage construct. The computer system can cause presentation of a search field in a user interface displayed by a remote computer system. The first communication is received as a result of an event in the search field. Further, a search result (a result of the performing the search operation) is communicated to the remote computer system and comprises item information corresponding to an item. The second communication can cause presentation of the search results in the user interface. The third communication represents a selection of the item in the user interface, and comprises at least a portion of the item information.

20 Claims, 22 Drawing Sheets

(56) References Cited

U.S. PATENT DOCUMENTS

| | | | |
|---|---|---|---|
| 2007/0038567 A1* | 2/2007 | Allaire | H04N 21/2547 |
| | | | 705/50 |
| 2008/0300998 A1* | 12/2008 | Harkabi | G06Q 30/06 |
| | | | 705/26.8 |
| 2010/0057586 A1* | 3/2010 | Chow | G06Q 30/0623 |
| | | | 705/26.1 |
| 2015/0206122 A1* | 7/2015 | Elliott | G06Q 20/29 |
| | | | 705/21 |
| 2015/0294377 A1* | 10/2015 | Chow | G06Q 30/0263 |
| | | | 705/347 |
| 2016/0352835 A1* | 12/2016 | Johannessen | G06Q 30/0207 |
| 2017/0236196 A1* | 8/2017 | Isaacson | G06Q 20/12 |
| | | | 705/14.51 |
| 2019/0007381 A1* | 1/2019 | Isaacson | G06Q 20/401 |
| 2019/0035000 A1* | 1/2019 | Soltanipour | H04L 51/32 |
| 2019/0087887 A1* | 3/2019 | Westphal | G06Q 30/0641 |
| 2019/0306137 A1* | 10/2019 | Isaacson | G06Q 20/12 |
| 2019/0325498 A1* | 10/2019 | Clark | G06Q 30/0625 |

\* cited by examiner

SHARE ITEM INFORMATION BY EMAIL

Item Image 1710

Item Title 1720

Item Description 1720

Your Information

First Name Field 1740

Last Name Field 1742

Postal Code Field 1744

Sender Email Address Field 1746

Recipient Information

Recipient Email Address Field 1750

Message Area 1760

Email Dialogue 1700

*Fig. 17*

METHOD AND SYSTEM FOR INTEGRATED SEARCH AND SELECTION IN A TRANSACTIONAL INTERFACE

FIELD OF THE INVENTION

The present invention relates to the characterization of products and/or services, and, more particularly, to a method and system for integrated search and selection in a transactional interface.

BACKGROUND

Computers have become an integral part of the daily lives of millions of individuals across the globe. We use computers, be they desktop computers, tablets, smartphones, or the like, to all manner of ends in this regard. One such purpose is the buying and selling of physical products, services, and the like, but also virtual items such as music, software, content access, premium content, and the like. This area of computer use, sometimes referred to in the generic as electronic commerce, provides us with a vast array of such products and services from which to choose. Unfortunately, such a vast array of offerings comes with a price—quickly and efficiently identifying and selecting the best alternative offered can prove to be something akin to finding the proverbial "needle in a haystack."

In this regard, present technologies employed to assist end-users with identifying (e.g., as by searching) and selecting a desired item from a number of potential alternatives are, at best, rudimentary. A good example of an application that encounters such problems is the user interfaces implemented by today's electronic commerce websites. A user's interactions with such electronic commerce websites tend to be burdened by non-intuitive and difficult-to-navigate website structure. Unfortunately, such issues are an outgrowth of the website's navigable structures necessitated by the functionalities provided. These difficulties, as well as others related to the structural problems endemic to electronic commerce websites (and indeed, any user interface that suffers from such infirmities), often result in a poor user experience for the users forced to contend with the user interfaces that necessarily result from the structures of the applications involved.

The foregoing problems, as well as other considerations, stand as obstacles to the efficient, effective presentation of information regarding products, services, and the like, when making such presentation in an electronic commerce environment. That being the case, it is therefore desirable to provide mechanisms for presenting some number of alternatives (e.g., in response to one or more terms and/or historical information), and allow selection of one or more such alternatives. Further, it is so desirable to be able to provide such functionality to an end-user in an effective, efficient manner, while avoiding the problems associated with the navigable structures of such applications and the complicated user interfaces that result.

BRIEF DESCRIPTION OF THE DRAWINGS

The present invention may be better understood, and its numerous objects, features and advantages made apparent to those skilled in the art by referencing the accompanying drawings.

FIG. 17 is a simplified diagram illustrating an example of a user interface dialogue depicting a dialogue that allows a user to share information regarding an item (e.g., a commercial offering) via email, according to methods and systems such as those disclosed herein.

DETAILED DESCRIPTION

Figure 1:
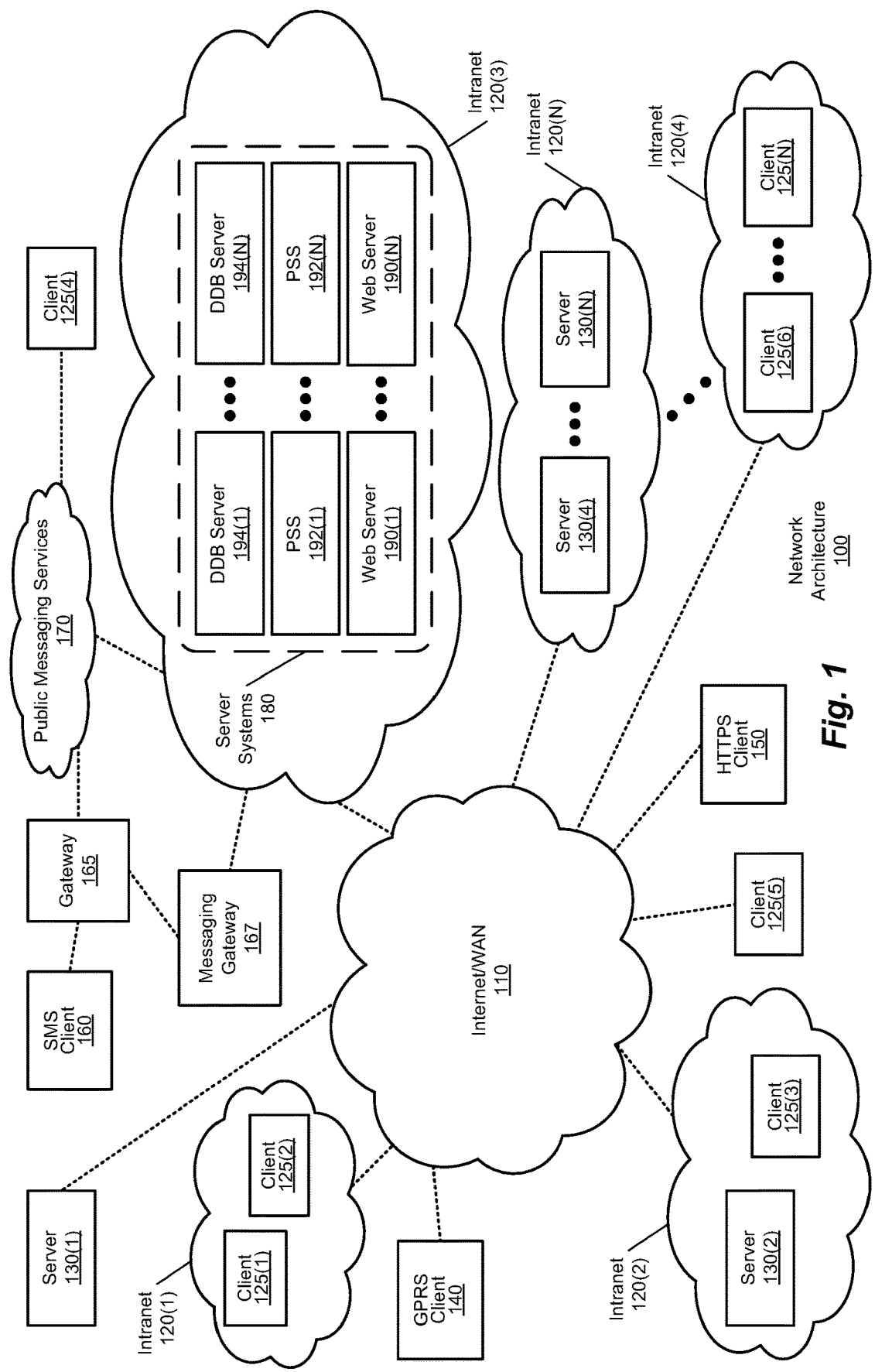
FIG. 1 is a block diagram illustrating an example of a network architecture, according to methods and systems such as those disclosed herein.

The following is intended to provide a detailed description of an example of the invention and should not be taken to be limiting of the invention itself. Rather, any number of variations may fall within the scope of the invention which is defined in the claims following the description.

Introduction

Methods and systems such as those described herein provide a method and system for integrated search and selection in a transactional interface. To this end, methods and systems such as those described herein support the display of information regarding an item (such as that described subsequently herein) in a search interface and the selection of one or more such items, which can result in the transfer of item information directly to a transaction storage construct, without the need for an intervening interaction between a user and such systems. In other embodiments, partial searches (e.g., information entry resulting in the display of categories, sub-categories, and the like) can result in the display of further sub-groupings of categories and/or specific items. Ultimately, however, selection of such specific items, when employing methods and systems such as those described herein, is able to result in the transfer of item information regarding the specific item (or items) to a transaction storage construct, without the need for further user interaction.

In so providing, such methods and systems facilitate the efficient, effective presentation of information regarding one or more selectable items (e.g., products, services, product-service systems, and the like (referred to herein, in the generic, as products and/or services) offered for sale (and so, referred to herein, in the generic as commercial offerings)), which can result from a present or historical search for such items, and subsequently provide for the selection of such selectable items (e.g., wherein such selection allows the selected selectable item(s) be purchased). Such functionality can be used to support the presentation, selection, and purchase of such items when making such presentation in, for example, an electronic commerce environment. Further, such methods and systems provide a mechanism for determining and maintaining information relevant to the presentation, selection, and purchase of one or more such items in an efficient, effective manner, and further still, effect the presentation of such information to an end-user in an effective, efficient, and intuitive manner.

As noted, existing alternatives for identifying items (e.g., such as products and/or services) that meet a customer's needs and desires, and allow for selection thereof, are fundamentally flawed. This is in part a result of the mechanistic qualities and functionalities such systems employ, and the flaws of their user interfaces, which result from such failings. Further complicating such shortcomings are the difficulties encountered by users that result from the structure of user interactions with such systems (e.g., the awkward and unintuitive navigational structure of today's electronic commerce websites). Further still, such existing alternatives also fail to recognize, and thus fail to capture, associations that may exist as between various items in the minds of end-users, that might be evident upon the analysis of, for example, historical search information (e.g., and the advantages of presenting such information to end-users). In light of these and other infirmities, the ability of such existing alternatives to provide fast, efficient, effective application navigation in such scenarios falls well short of meeting customer expectations, and so results in a less than optimal customer experience.

To address such failings, methods and systems such as those described herein provide the ability to transfer of item information (i.e., information regarding an item that can be used, for example, to identify the item) from a search interface to a transaction storage construct, either directly (as by a user selecting an item immediately presented by way of a search bar according to methods and systems such as those described herein), or by selection of a specific item produced by one or more levels of sub-categories (essentially, sub-groupings of items into such sub-categories in parentheses. Thus, certain embodiments are able to effect such transfer of item information without the need for any further interactions between the user interface and such systems. Alternatively, in certain other embodiments, additional menus of selections (referred to generically herein as "listings") may be presented as part of such a search interface, while ultimately allowing a user to store one or more selected items directly into the transaction storage construct in question.

With respect to end-users, methods and systems such as those described herein provide a more streamlined, intuitive, and user-friendly user experience when employing a user interface implemented in the manner of the present disclosure. Rather than having to navigate through a potentially large number of application screens, in order to record one or more desired items, a user employing such a user interface is able to quickly and easily select and store such items in a transaction storage construct. By providing such advantages, implementation of methods and systems such as those described herein also improve the operation of computer systems supporting such limitations, by reducing the amount of interaction with the user interface thus presented, reducing the need to transfer and display information, and reducing the amount of information needing to be stored at a client computing system, among numerous other advantages, which will become apparent in light of the figures and the descriptions thereof that follow.

Example Network Architecture

FIG. 1 is a block diagram illustrating an example of a network architecture 100 that includes a server system according to one embodiment. Network architecture 100 includes an internetwork (depicted in FIG. 1 as an internet/wide area network (WAN) 110), which is configured to couple a number of intranets to one another (depicted in FIG. 1 as intranets 120(1)-(N)). Intranets 120(1)-(N), in turn, can include a number of components, such as one or more clients (depicted in FIG. 1 as clients 125(1)-(N)) and/or servers (depicted in FIG. 1 as servers 130(1)-(N)). Clients 125(1)-(N) and/or servers 130(1)-(N) can, for example, be implemented using computer systems such as those described in connection with FIGS. 21 and 22. Internet/WAN 110 thus communicatively couples intranets 120(1)-(N) to one another, thereby allowing clients 125(1)-(N) and servers 130(1)-(N) to communicate with one another (and can, in certain embodiments, provide for the servers of intranets 120(3) and 120(N), for example, to operate as cloud-based server systems). As is depicted in FIG. 1, clients 125(1)-(N) can be communicatively coupled to one another and to servers 130(1)-(N) as part of one of intranets 120(1)-(N), or directly via internet/WAN 110. Similarly, servers 130(1)-(N) can be coupled via intranet/WAN 110 via a direct connection to intranet/WAN 110, or as part of one of intranets 120(1)-(N).

Network architecture 100 also provides for communication via intranet/WAN 110 using one or more other devices. Such devices can include, for example, a general packet radio service (GPRS) client 140 (e.g., a "smart phone," a "tablet" computer, or other such mobile device), a secure web client (depicted in FIG. 1 as a secure hypertext transfer protocol client 150), and a basic cellular phone (e.g., using standard texting or other communication protocols, and depicted in FIG. 1 as a simple messaging service (SMS) client 160). HTTPS client 150 can be, for example, a laptop computer using the HTTP Secure (HTTPS) protocol. Support for GPRS clients, SMS clients, HTTP clients, and the like thereby provide users with communication functionality according to an embodiment in a mobile environment. As is also depicted in FIG. 1, SMS client 160 can communicate via internet/WAN 110 via several channels. SMS client 160 can communicate directly, for example, with a gateway 165, which, in turn, communicates with internet/WAN 110 via a messaging gateway 167 and, optionally, elements within intranet 120(3), for example. Alternatively, SMS client 160 can, via gateway 165, communicate with intranet 120(3) (and so, internet/WAN 110) via public messaging services 170 to which gateway 165 and intranet 120(3) are connected. As is also depicted in FIG. 1, a client 125(4) is also able to communicate via internet/WAN 110 by way of public communication services 170 and intranet 120(3). In order to support such communications, as well as other communications according to various embodiments, intranet 120(3) includes server systems 180, as well as (optionally) providing for a number of clients (not shown), in the manner of intranet 120(2).

Server systems 180 include a number of components that allow server systems 180 to provide various functionalities (e.g., supporting various communications, web-based services, cloud-based services, enterprise services, and so on). Among these components, in certain embodiments, are a number of servers, which can be implemented in hardware and/or software. Examples of such servers include web servers (depicted in FIG. 1 as web servers 190(1)-(N)), product and/or search servers (PSS; depicted in FIG. 1 as PSS 192(1)-(N)), and distributed database (DDB) servers (depicted in FIG. 1 as DDB servers 194(1)-(N)).

Servers such as those included in server systems 180 are designed to include hardware and/or software configured to facilitate functionalities that support operations according to the concepts disclosed herein, among other possible such components and mechanisms, in communication with one another (e.g., directly, via various application programming interfaces (APIs) and/or other such interfaces, and/or other such mechanisms and/or constructs). As will be discussed in greater detail in connection with FIG. 2, the server systems of server systems 180 provide such functionality, for example by presenting end-users with a website (functionality effected by, for example, web servers 190(1)-(N)). In so doing, web servers 190(1)-(N) present information collected, generated, organized, and maintained by one or more of PSS 192(1)-(N) and/or DDB servers 194(1)-(N). Such a website can be accessed by an end-user using a client computing device such as one or more of clients 125(1)-(N), GPRS client 140, HTTPS client 150, and/or SMS client 160. As will be appreciated in light of the present disclosure, the ability to support such functionality on mobile devices such as those described herein is of importance, as mobile electronic commerce is fast becoming an important facet of today's online environment. In providing functionality such as that described herein, network architecture 100 is able to support the identification and presentation of relevant product/service information in an efficient, effective manner.

It will be appreciated that, in light of the present disclosure, the variable identifier "N" is used in several instances in various of the figures herein to more simply designate the final element of a series of related or similar elements (e.g., intranets 120(1)-(N), clients 125(1)-(N), and servers 130(1)-(N)). The repeated use of such variable identifiers is not meant to imply a correlation between the sizes of such series of elements. The use of variable identifiers of this sort in no way is intended to (and does not) require that each series of elements have the same number of elements as another series delimited by the same variable identifier. Rather, in each instance of use, variables thus identified may represent the same or a different value than other instances of the same variable identifier.

As will be appreciated in light of the present disclosure, processes according to concepts embodied by systems such as those described herein include one or more operations that may be performed in any appropriate order. It is appreciated that operations discussed herein may consist of directly entered commands by a computer system user or by steps executed by application specific hardware modules, but the preferred embodiment includes steps executed by software modules. The functionality of steps referred to herein may correspond to the functionality of modules or portions of modules.

The operations referred to herein may be modules or portions of modules (e.g., software, firmware or hardware modules). For example, although the described embodiment includes software modules and/or includes manually entered user commands, the various example modules may be application specific hardware modules. The software modules discussed herein may include script, batch or other executable files, or combinations and/or portions of such files. The software modules may include a computer program or subroutines thereof encoded on computer-readable storage media.

Additionally, those skilled in the art will recognize that the boundaries between modules are merely illustrative and alternative embodiments may merge modules or impose an alternative decomposition of functionality of modules. For example, the modules discussed herein may be decomposed into submodules to be executed as multiple computer processes, and, optionally, on multiple computers. Moreover, alternative embodiments may combine multiple instances of a particular module or submodule. Furthermore, those skilled in the art will recognize that the operations described in example embodiment are for illustration only. Operations may be combined or the functionality of the operations may be distributed in additional operations in accordance with the invention.

Alternatively, such actions may be embodied in the structure of circuitry that implements such functionality, such as the micro-code of a complex instruction set computer (CISC), firmware programmed into programmable or erasable/programmable devices, the configuration of a field-programmable gate array (FPGA), the design of a gate array or full-custom application-specific integrated circuit (ASIC), or the like.

Example Architectures for Characterization of Products and/or Services

Figure 2:
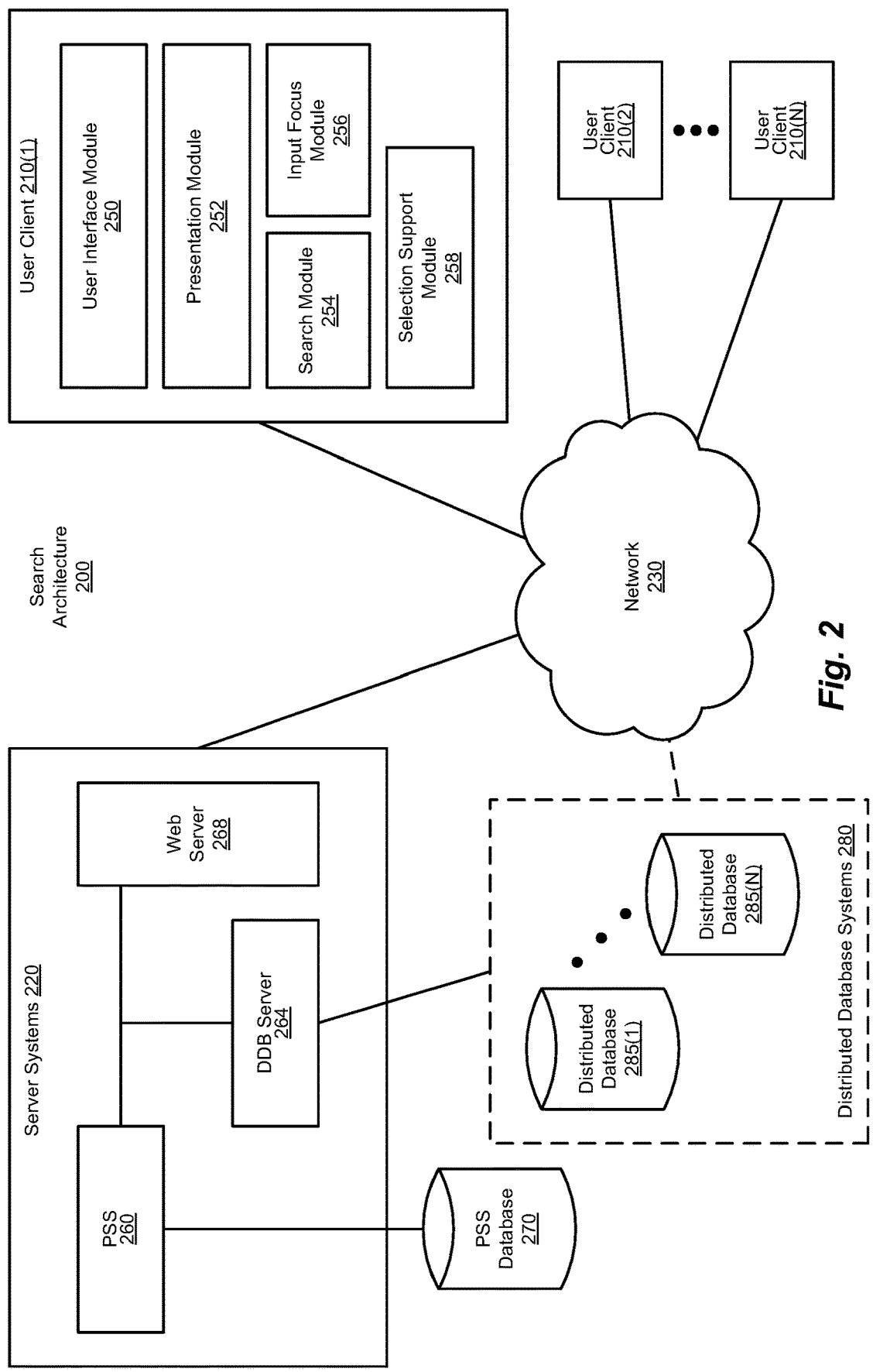
FIG. 2 is a block diagram illustrating an example of a search architecture, according to methods and systems such as those disclosed herein.

FIG. 2 is a block diagram illustrating an example of a search architecture, according to methods and systems such as those disclosed herein. The search architecture of FIG. 2 (depicted in FIG. 2 as a search architecture 200) presents a simplified illustration of the salient features of network architecture 100 with regard to certain aspects of methods and systems such as those disclosed herein. That being the case, search architecture 200 is depicted as including a number of client computer systems (e.g., depicted in FIG. 2 as user clients 210(1)-(N) (in the manner of clients 125(1)-(N)), which are referred to in the aggregate as user clients 210) and server systems (e.g., depicted in FIG. 2 as server systems 220 (in the manner of server systems 180), which are referred to in the aggregate as server systems 220). User clients 210 and server systems 220 can be communicatively coupled to one another in search architecture 200 by some manner of communications network (e.g., depicted in FIG. 2 as network 230). Each of user clients 210 can include a number of components in order to provide functionality that supports various of the features of the methods and systems described herein. To that end, user client 210(1) is shown as including a user interface module 250, which is supported by a presentation module 252. User interface module 250 and presentation module 252 serve to present a user of user client 210(1) with a user interface that implements methods and systems such as those described herein. This allows, for example, the aforementioned visual representation of product/service information to be presented in a user interface displayed on a computer's display. User client 210(1) also includes functional modules (which can be implemented in hardware, software, or a combination thereof) that implement various of the functionalities presented to the user by way of user interface module 250 and presentation module 252. For example, such functional modules can include a search communications module 254, an input focus module 256, a selection support module 258, and other such modules, as may be implemented in support of the aforementioned functionalities.

In operation, product/service information can be searched for via search communications module 254, and then presented in the user interface displayed by a display user client 210(1) by way of presentation module 252 and user interface module 250. In the scenario in which a screen event (or more simply, an event) occurs in a user interface (e.g., cursor focus is received), such an event can be used to drive such a search process according to methods and systems such as those described herein. Such an event can be used as input to be gathered by a module such as input focus module 256. As will be appreciated, such focus indicates the component of the graphical user interface that is selected to receive input. Text entered at the keyboard or pasted from a clipboard is sent to the component that has the focus. Moving the focus away from a specific user interface element is known as a "blur" event in relation to this element. Typically, the focus is withdrawn from an element by giving another element the focus. This means that focus and blur events typically both occur virtually simultaneously, but in relation to different user interface elements, one that gets the focus and one that gets blurred.

Upon the display of the requisite product/service information, a selection made by the user in the user interface presented by user interface module 250 and presentation module 252 can be received by selection support module 258. As will be appreciated, search communications module 254 and selection support module 258 can communicate with the servers of server systems 220 via network 230, in providing the search and selection functionality described herein.

In turn, and in the manner of various of the components described in connection with FIG. 1, server systems 220 can include, for example, a PSS 260, a DDB server 264, and a web server 268, variously in communication with one another. Server systems 220 are supported by a number of databases storing various information in support of the functionality provided by server systems 222 user clients 210 via network 230. These databases can include, for example, a PSS database 270 and one or more distributed databases (e.g., depicted in FIG. 2, in the aggregate, as distributed database systems 280, and more specifically, as a number of distributed databases (DDB) 285(1)-(N)).

PSS database 270 can be implemented using, for example, a document-oriented database, or document store (a computer program designed for storing, retrieving and managing document-oriented information, which can be referred to as, for example, semi-structured data). Such a document-oriented databases (a type of "NoSQL" database, which refers to the fact that such databases are in contrast to a traditional relational database (RDB)) can be implemented, more specifically, as XML databases (a subclass of document-oriented databases that are optimized to work with XML documents) or graph databases (which are similar, but add another layer, the relationship, which allows them to link documents for rapid traversal). Such document-oriented databases are inherently a subclass of the key-value store, which is another NoSQL database concept. One difference is the manner in which the data is processed: in a key-value store, the data is considered to be inherently opaque to the database, whereas a document-oriented system relies on internal structure in the document in order to extract metadata that the database engine uses for further optimization. Such a document database, for example, can store all information for a given object in a single instance in the database, and every stored object can be different from every other, thus eliminating the need for object-relational mapping while loading data into the database.

With reference to the aforementioned communications with user clients 210, it will be appreciated, in light of the present disclosure, that a user interface presented by user interface module 250 and presentation module 252 can be generated, for example, by web server 268, in conjunction with its interactions with PSS 260 and DDB server 264. As will also be appreciated, in providing such "back-end" functionality, PSS 260 and DDB server 264 access their respective databases (e.g., PSS database 270 and distributed database systems 280, respectively) in order to provide the requisite information for web server 268 to serve to user clients 210.

As will be apparent in view of the description of FIG. 2, as well as those of other of the figures, the components of search architecture 200 and their interconnection (and so, intercommunication) are such that the functionalities described herein are presented in a user interface at a client computing device such as user client 210(1), in a user interface generated by user interface module 250 and presentation module 252, as noted. As also noted, search module 254, input focus module 256, and selection support module 258, among others, are designed in a manner to support such functionalities. PSS 260 (as well as various components corresponding thereto, as described in connection with FIG. 6, subsequently) provides for interaction with both PSS database 270 (which can be used to maintain information such as user information, user search history information, search terms specifically saved by user, and other such relevant information as may be advantageous to the support and operation of the systems of search architecture 200, in providing such functionality), and distributed database systems 280 (by way of DDB server 264; which can be used to maintain information such as item information (e.g., products, services, product/service systems, and other commercial offerings, for example)). More specific examples are provided in connection with the embodiments depicted in FIGS. 6 and 7, subsequently.

Figure 3:
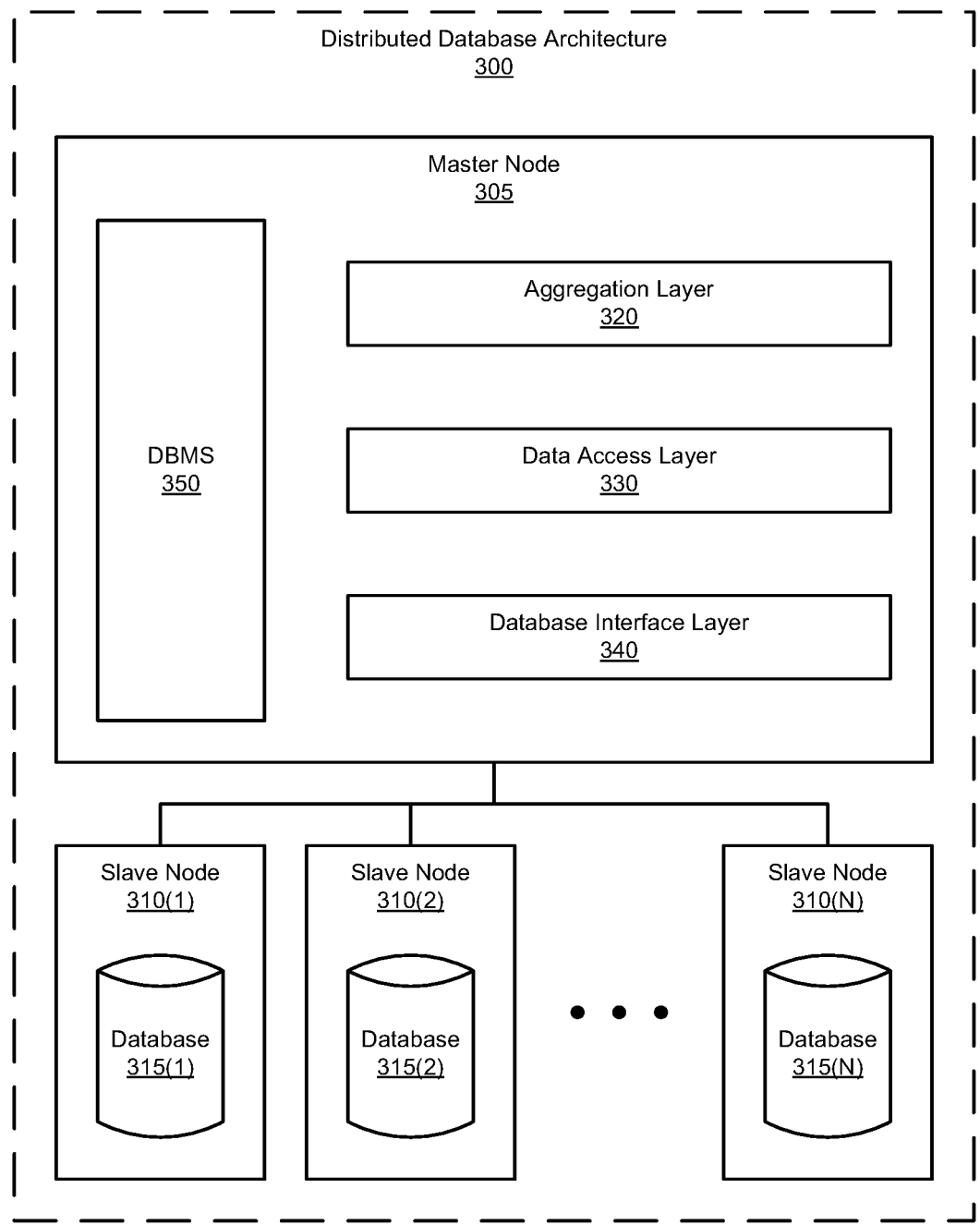
FIG. 3 is a block diagram illustrating an example of a distributed database architecture, according to methods and systems such as those disclosed herein.

FIG. 3 is a block diagram illustrating an example of a distributed database architecture, according to methods and systems such as those disclosed herein. The database server architecture of FIG. 3 (depicted in FIG. 3 as a database server architecture 300) can include one or more master nodes (e.g., depicted in FIG. 3 as a master node 305) and some number of slave nodes (e.g., depicted in FIG. 3 as slave nodes 310(1)-(N), and referred to in the aggregate as slave nodes 310). Slave nodes 310, in turn, can include one or more databases (e.g., depicted in FIG. 3 as databases 315(1)-(N), and referred to in the aggregate as databases 315).

Returning to master node 305, master node 305 includes an aggregation layer 320, a data access layer 330, and a database interface layer 340. As is also depicted in FIG. 3, a database management system (DBMS) 350 is implemented, for example, in master node 305, and acts to manage various of the components of distributed database architecture 300, thereby supporting the distributed nature of distributed database architecture 300. As will be appreciated in view of the present disclosure, a distributed database is a database in which storage devices are not all attached to a common processor. It may be stored in multiple computers, located in the same physical location; or may be dispersed over a network of interconnected computers. Unlike parallel systems, in which the processors are tightly coupled and constitute a single database system, a distributed database system consists of loosely coupled sites that share no physical components. System administrators can distribute collections of data (e.g. in a database) across multiple physical locations. A distributed database can reside on organized network servers or decentralized independent computers on the Internet, on corporate intranets or extranets, or on other organization networks. Because Distributed databases store data across multiple computers, distributed databases may improve performance at end-user worksites by allowing transactions to be processed on many machines, instead of being limited to one.

An aggregation layer such as aggregation layer 320 facilitates the gathering and organization of information from various information sources appropriate to the information administered and maintained by server 305. For example, in certain embodiments, components within an aggregation layer of a server such as PSS 260 receive and organize information (e.g., one or more search results, one or more selections, interaction information, end-user feedback, and/or other such information) from one or more user clients such as user clients 210(1)-(N). Such components can include, for example, modules such as product/service information processing modules and the like. Similarly, components within an aggregation layer of a server such as DDB server 264 receive and organize one or more product/service descriptors from modules of one or more user clients such as selection support module 258. Such components can include, for example, modules such as product/service descriptor processing modules and the like. As will be appreciated in light of the present disclosure, such aggregation layers also provide, in turn, functionality that supports distribution of information such as that maintained in the databases or their respective servers.

Situated between aggregation layer 320 and database interface layer 340 is data access layer 330, which supports storage/retrieval of aggregated data to/from one or more databases (e.g., such as lists of products/services). Data access layer 330 facilitates such storage/retrieval by using a common structure to sink and source such aggregated data. Data access layer 330 facilitates access to such databases (depicted in FIG. 3 as databases 315(1)-(N)) via database interface layer 340. Database interface layer 340 facilitates communication of aggregated data using the common structure to databases 315(1)-(N) in a structure appropriate to each of databases 315(1)-(N) and/or to databases 315, collectively. As noted, and with particular regard to the discussion of FIG. 2, an arrangement such as database server architecture 300 can be used in the implementation of servers such as PSS 260 and DDB server 264. To this end, an aggregation layer such as aggregation layer 320 supports the collection of information from multiple sources (e.g., user clients 210(1)-(N)), and provides such information for storage in a respective database, via a data access layer such as data access layer 330 (which produces aggregated data in a common structure for storage, and receives data in the common format when retrieving such data) and a database interface layer such as database interface layer 340 (which takes in the aggregated data in the common structure and produces data in a structure appropriate to the database into which the data is to be stored, and conversely, provides data in the common structure when retrieving such data). Such an architecture, in turn, supports the retrieval of such data. Further, server systems such as PSS 260 and DDB server 264 are able to support multiple processing modules (e.g., such as those described in connection with FIG. 4), and so permit support for simultaneous interactions with multiple user clients in parallel.

Figure 4:
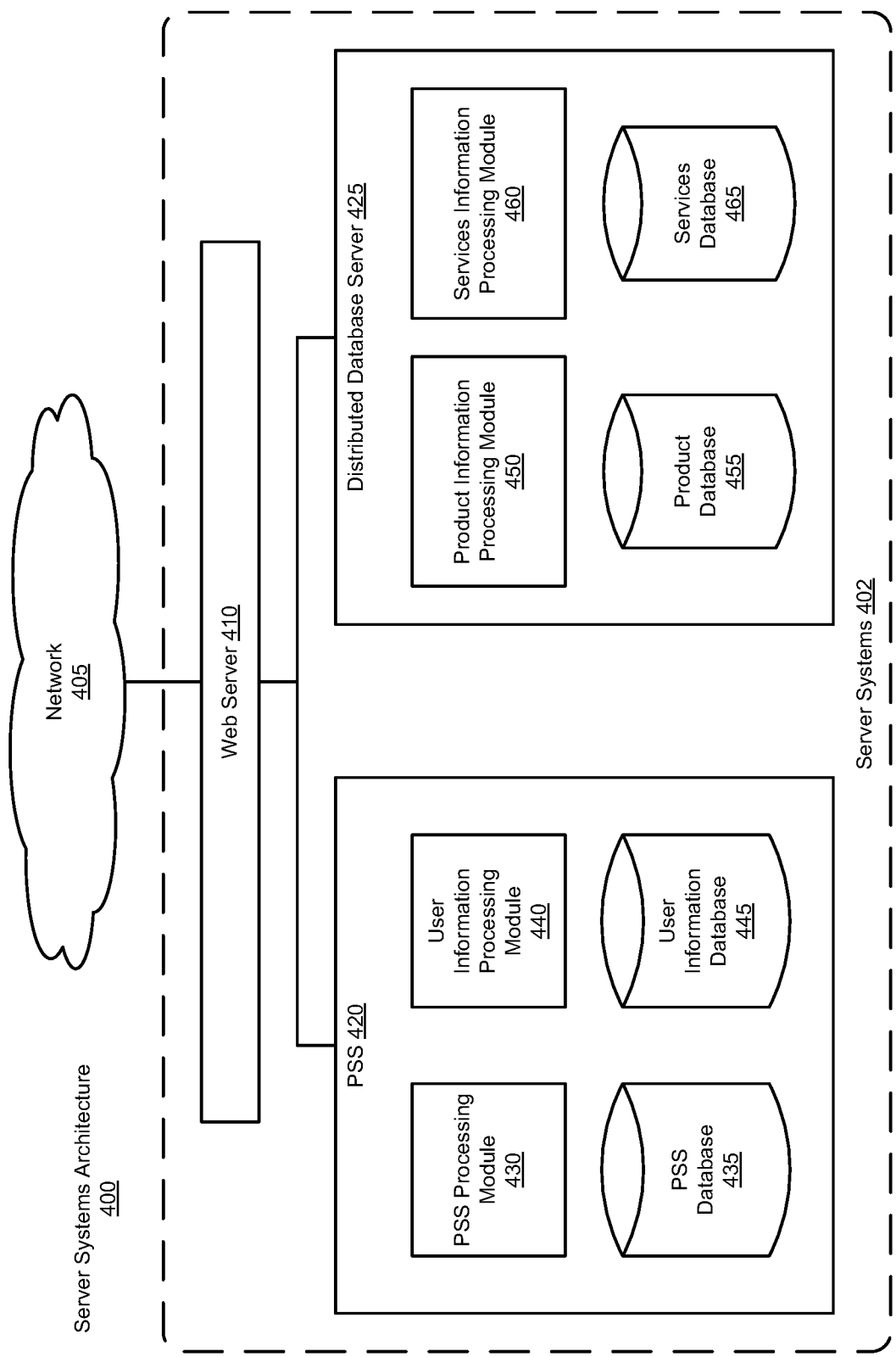
FIG. 4 is a simplified block diagram illustrating an example of a server systems architecture, according to methods and systems such as those disclosed herein.

FIG. 4 is a simplified block diagram illustrating an example of a server systems architecture, according to methods and systems such as those disclosed herein. The server systems architecture of FIG. 4 (depicted as a server systems architecture 400) includes one or more server systems (depicted in FIG. 4 as server systems 402), which are communicatively coupled to a network 405. As will be appreciated, network 405 allows access to server systems 402 by computer systems such as those depicted in FIGS. 1 and 2.

In the example presented as server systems architecture 400, such computer systems access server systems 402 via network 405 by accessing a web server 410, which presents web pages generated using hyper-text markup language (HTML), extensible markup language (XML), or other such means, for example. In so doing, web server 410 "serves" (provides) information to such computer systems from the servers of server systems 402, which can include, for example, a PSS 420 and a DDB server 425. In order to present web pages having information regarding products and/or services (referred to herein as products and/or services information, or more simply, product/service information), web server 410 serves at least a portion of such product/service information from PSS 420. PSS 420, in order to provide such product/service information, includes a PSS processing module 430 (in certain embodiments, communicatively coupled to a PSS database 435) and a user information processing module 440 (in certain embodiments, communicatively coupled to a user information database 445). In certain embodiments, PSS 420 provides product/service information to web server 410 by invoking PSS processing module 430, which retrieves product/service information (as well as any associated metadata) from PSS database 435. As will be appreciated in light of the present disclosure, PSS processing module 430 and PSS database 435 (and PSS 420, generally) can employ a database server architecture such as distributed database architecture 300. An example of the communications supported by an architecture such as server systems architecture 400 is described in connection with FIG. 5.

Similarly, user information processing module 440, being communicatively coupled to user information database 445, provides the ability to store/retrieve user information to/from user information database 445, in order to maintain information regarding customers' and their interactions in using a system according to methods and systems such as those described herein. For example, such user information can be received directly from customers, in response to a solicitation for such information (e.g., by way of a search request received via the user interface presented to the customer as part of their interactions with the website). Such user information can comprehend a customer's experience(s) and reflect the customer's opinion of the alternatives presented (e.g., in terms of the alternatives' perceived relatedness to the product/service desired), the appropriateness of the alternatives presented (e.g., in terms of how well alternatives presented agreed with the customer's tastes, desires, and expectations), and other such factors.

In order to support the searching and identification of product/service information, server systems 402 also provide for a distributed database server such as DDB server 425. In contrast to the operational nature of PSS 420 (i.e., the provision of product/service information by PSS 420, in response to receipt of one or more search descriptors and/or other such information), DDB server 425 supports the gathering, processing, and maintenance of information, in the form of product information, services information, and other information related thereto, that is related to the products and services represented by such product/service information. DDB server 425 can thus include a product information processing module 450 (in certain embodiments, communicatively coupled to a product database 455) and a services information processing module 460 (in certain embodiments, communicatively coupled to a services database 465). Product information processing module 450, using, for example, an architecture such as distributed database architecture 300, stores information to and retrieves information from product database 455 (e.g., using search terms received from remote computer systems such as user clients 210(1)-(N)). Similarly, services information processing module 460, using, for example, an architecture such as distributed database architecture 300, stores information to and retrieves information from services database 465 (e.g., using search terms received from remote computer systems such as user clients 210(1)-(N)).

With further regard to the gathering and maintenance of information useful in improving customer experience by facilitating the search and selection of products/services the of the aforementioned user interface, information regarding a user's interactions with systems such as those described herein can be stored in/retrieved from user information database 445 by user information processing module 440, as noted. These interactions can reflect, for example, a customer's interactions with the given website, information regarding product/service selections made, information regarding the customer's navigation through the product/service alternatives presented, and other sources of such interaction information as may be gleaned from a customer's use of and interactions with the website. In a fashion similar to that noted with respect to other such information gathered, such interaction information can be used in revising information presented to a user for subsequent searching and/or selection, and in so doing, improve customer experience by effecting changes to the related information subsequently presented to the user.

Thus, in certain embodiments, user information database 445 can include information regarding a customer's explicit feedback with respect to their experience with searching for a desired product and/service, as noted. In contrast, the information maintained in user information database 465 can reflect a given customer's interactions with the website, as automatically recorded during those interactions. In the implementation depicted in FIG. 4, user information processing module 440 and user information database 465 are implemented as part of PSS 420, while product information processing module 450 and services information processing module 460 and their associated databases (product database 455 and services database 465) are implemented as part of DDB server 425. While other implementations are intended to come within the scope of the present disclosure, the implementation depicted in FIG. 4 is a recognition of the more explicit nature of both content (e.g., product/service information) and feedback information, and, correspondingly, the more implicit nature of both product/services descriptions and information regarding user interactions. As will be appreciated in light of the present disclosure, however, other arrangements of these components is possible, and, as noted, are intended to come within the scope of the present disclosure. Further, the structures depicted in FIG. 4 demonstrate only one example of structures that can be used to maintain information reflecting such relationships.

Example Interactions Between Server System Components

Figure 5:
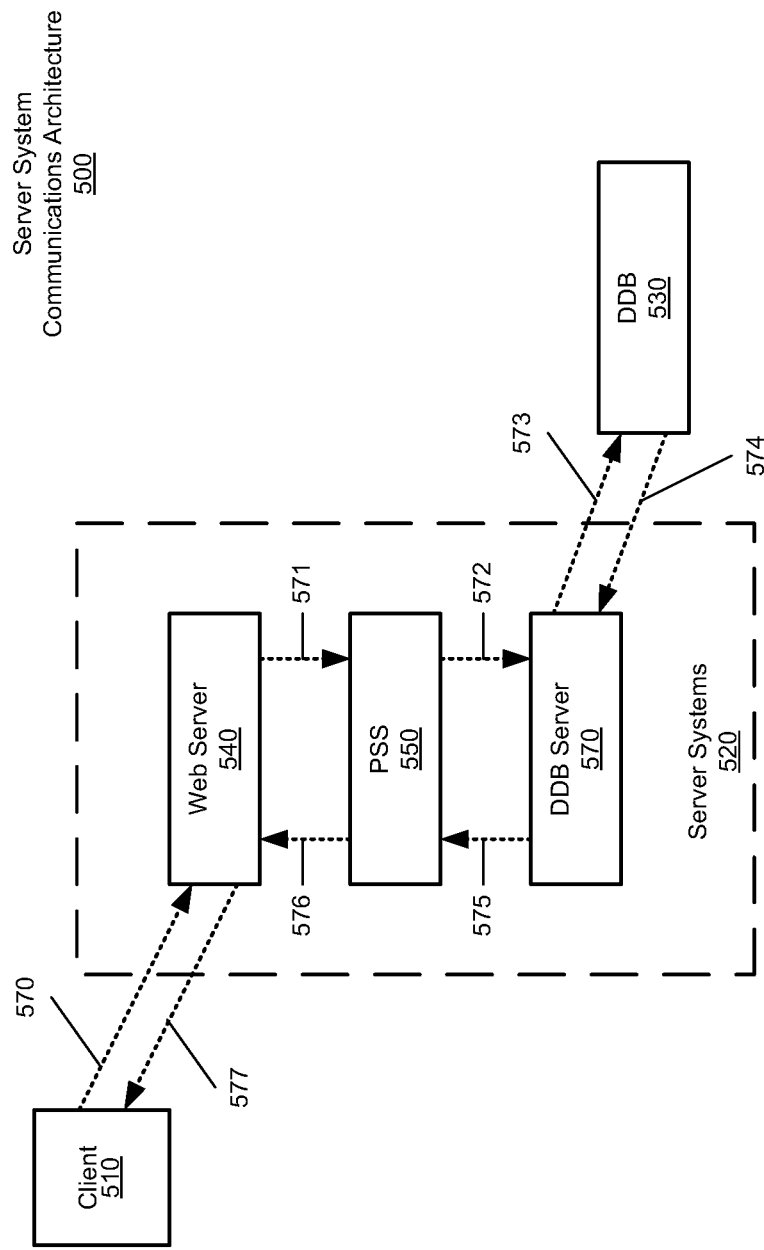
FIG. 5 is a simplified block diagram illustrating an example of communications within portions of a server systems architecture such as that depicted in FIG. 4, according to methods and systems such as those disclosed herein.

FIG. 5 is a simplified block diagram illustrating an example of communications within portions of a server systems architecture such as that depicted in FIG. 4, according to methods and systems such as those disclosed herein. More specifically, FIG. 5 depicts a server system communications architecture 500, which includes a client 510 and server systems 520. Also shown as part of server system communications architecture 500 are one or more distributed databases (e.g., depicted in FIG. 5 as distributed databases (DDB) 530). In turn, server systems 520 are depicted as including a web server 540, a PSS 550, and a DDB server 560. FIG. 5 also depicts various communications that can occur within server system communications architecture 500.

In the example depicted in FIG. 5, client 510 communicates the server systems 520 in order to present a user of client 510 with one or more items (as by listing some number of such items (i.e., alternatives, options, or the like) in, for example, a drop-down menu produced in conjunction with a search dialog box in the user interface). Thus, in this example, client 510 communicates with web server 540, with web server 540 serving one or more web pages that include information regarding such items. As part of such operations, information to be presented in such a list is provided by PSS 550 to web server 540. In response to PSS 550 providing such information, DDB server 560 accesses DDB 530, in order to gather such information for provision to PSS 550. An example of such a process is now presented.

In one embodiment, the aforementioned process can proceed in the following manner. Client 510 sends a communication 570 to web server 540. For example, such a communication can be the result of a user indicating that a search is desired, or even simply by moving a cursor into a search bar's area in the user interface (also referred to as "mousing over" an area of a user interface, such as a search bar). In response to a communication such as communication 570, web server 540 sends a communication 571 to PSS 550, in order to prompt PSS 550 to gather the requisite information and provide that to web server 540 for, ultimately, display in the aforementioned user interface. That being the case, communication 571 can be an indication that the user has indicated use of a search interface (e.g., a search bar). This indication can trigger PSS 550 to generate a communication 572, which can include information regarding one or more items, information for which is to be presented in the user interface. Such information can include, for example, search terms based on historical information gathered during the use of the user interface by the user. In one embodiment, then, communication 572 takes the form of a search query, which is directed to DDB server 570. Such a search query can be implemented as a search function that, for example, presents one or more search categories, sub-categories, and/or items (e.g., using a drop-down menu element) corresponding to one or more search parameters (e.g., search terms entered in the search field of a search bar). In such an architecture, the implementation of a search drop-down sends the relevant search data to an API server such as that described in connection with FIG. 6. Such an API server returns the requisite search results (e.g., with such results using JavaScript Object Notation (JSON), for example). (In using a search page, such results can be presented using commands such as POST or GET.)

In turn, DDB server 570 sends a communication 573 including search data to one or more of the distributed databases (DDB 530), which respond to DDB server 570 with result data in the form of, for example, a communication 574. DDB server 570 then provides this search data to PSS 550 in the form of a communication 575 that includes a result data. PSS 550 presents this result data to web server 540 as search results in a communication 576. Web server 540 can then include the search results in information served to client 510 as part of a webpage included in a communication 577.

In the aforementioned process, as well as processes comparable thereto, mechanisms such as those described facilitate the presentation of one or more items to a user, in the user interface presented by, for example, client 510, as part of the user's interactions with search functionality presented as part of such a user interface. One such information has been gathered and presented to the user in this manner, the user is able to identify (e.g., by selecting) one or more of the items listed, and so record such selection. Such recordation can be effected, for example, by storing information regarding the item (e.g., product/service) selected in a transactional construct. In facilitating such presentation in selection, methods and systems such as those described herein simplify a user's interaction with such systems, and improve the efficiency of both the user's navigation through the information presented by such systems, and also the operation of such systems (e.g., by reducing the number of operations such systems are forced to perform in supporting such interactions).

Figure 6:
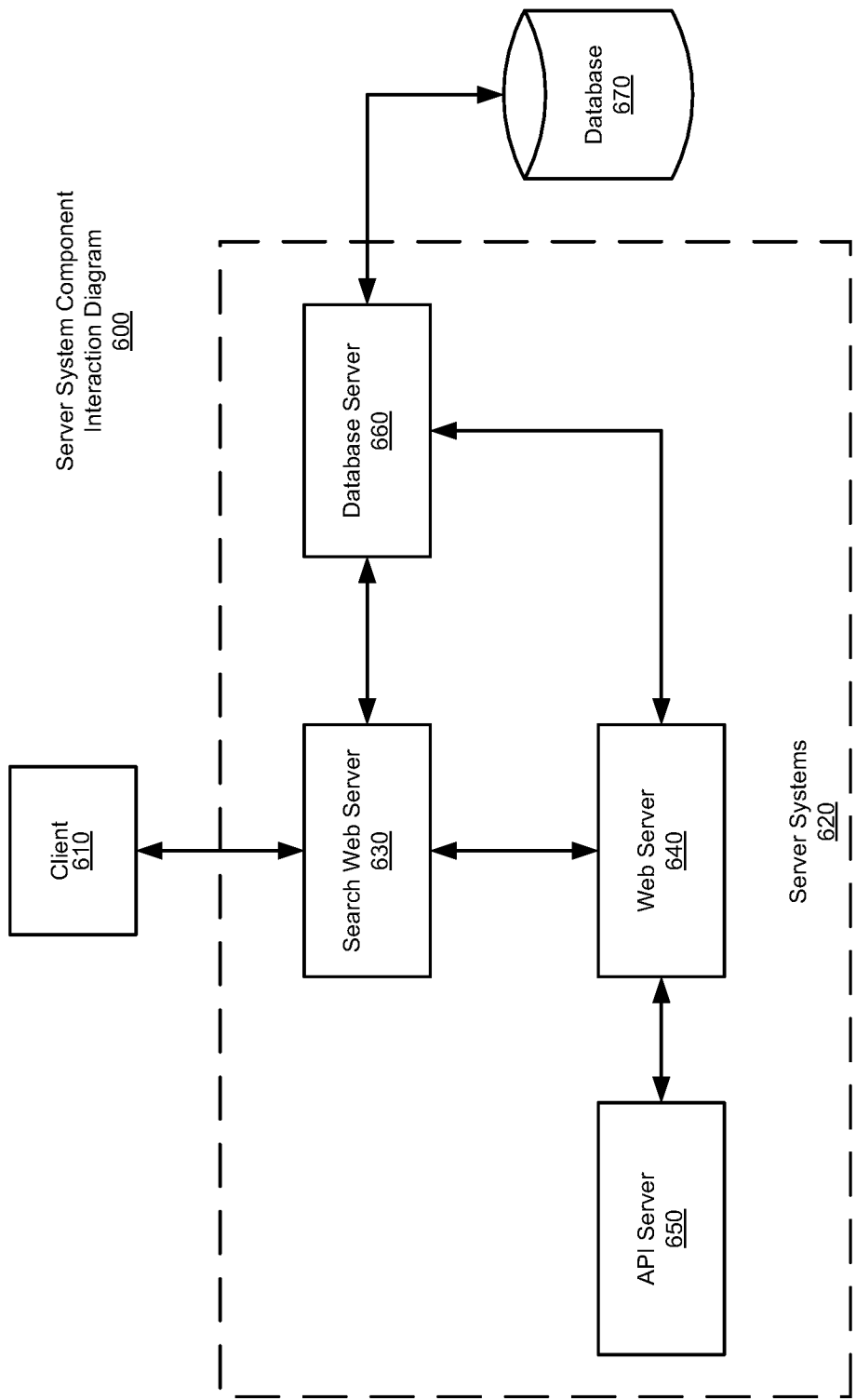
FIG. 6 is a simplified block diagram illustrating an example of interactions between components of a server systems architecture such as that depicted in FIG. 4, according to methods and systems such as those disclosed herein.

FIG. 6 is a simplified block diagram illustrating an example of interactions between components of another example of a server systems architecture such as that depicted in FIG. 4, according to methods and systems such as those disclosed herein. In the example depicted in FIG. 6, a server system component interaction diagram 600 is presented. Server system component interaction diagram 600 includes a client 610 and server systems 620. Server systems 620 include a search web server 630 and a web server 640. Web server 640 supports an application programming interface (API) server 650. Search web server 630 and web server 640 are communicatively coupled to a database server 660, which support searching of a database 670.

In the implementation presented as server system component interaction diagram 600, a user of client 610 interacts with the components of server systems 620 in order to be presented with alternatives for selection that are retrieved from database 670, in the manner discussed in connection with search architecture 200 and server system communications architecture 500. However, unlike the aforementioned architectures, the server systems of server systems 620 are communicatively coupled in a manner that facilitates the fast, efficient retrieval of information from database 670. In this regard, communications such as those described in connection with server system communications architecture 500 are carried out in a more direct fashion. That being the case, communications from client 610 are first processed by search web server 630, which, in such an embodiment, communicates directly with database server 660 (and so database 670). As will be appreciated in light of the present disclosure, the implementation of such an architecture in server systems 620 allows search web server 630 to, for example, intercept communications from client 610 that indicate one or more items are to be listed in the user interface presented to a user by client 610. Search web server 630, in response to such indication, can then interact with database server 662 gather the requisite information for display in the user interface from database 670, and subsequent selection (potentially) by the user. Alternatively, if such communication does not involve such indication, the communication can be passed to web server 640. That said, in support of multiple modes of search functionality, web server 640 supports API server 650, as well as communications with database server 660 (and so, database 670).

In operation, an implementation such as that depicted in server system component interaction diagram 600 can perform operations in the following manner (some as noted). As noted, a search query can be implemented as a search function that, for example, presents one or more search categories, sub-categories, and/or items (e.g., using a drop-down menu element) corresponding to one or more search parameters (e.g., search terms entered in the search field of a search bar). In such an architecture, the implementation of a search drop-down sends the relevant search data to API server 650. API server 650 returns the requisite search results (e.g., with such results using JavaScript Object Notation (JSON), as noted). Web server 640 can also query API server 654 information regarding a selected item or items, such as inventory information and price information. This can be accomplished, by web server 640 querying API server 654 (e.g., an external API that facilitates access to a hierarchical database, in which information is structured in records that are subdivided into a hierarchy of related segments, for example). Again, such information can be in a JSON format. Customer identity in such communications can be maintained with such communications by way of a customer identity token (also referred to herein as an authorization token). In certain embodiments, such authorization tokens are passed with all communications, in order to not only allow identification of such communications, but also to maintain the security of such communications. Such an authorization token can be generated, for example, by hashing information that is somehow associated with the user, user account, transaction occurring, computing devices employed, and/or other such information. Preferably, such information, at least in part, will be unique in some fashion (e.g., unique to the given user and/or user account, for example, and/or to the transaction (a time associated with the transaction (the transaction's start, completion, or the like), information regarding the client computing system involved, and/or other such information). In so doing, not only is the security of such communications enhanced, but by using hashed information, such communications can be performed in a fast, efficient manner, while enjoying the tracking, security, and other benefits provided by an authorization token according to embodiments of methods and systems such as those described herein.

Example Processes for the Identification, Presentation, and Selection of Items

Figure 7:
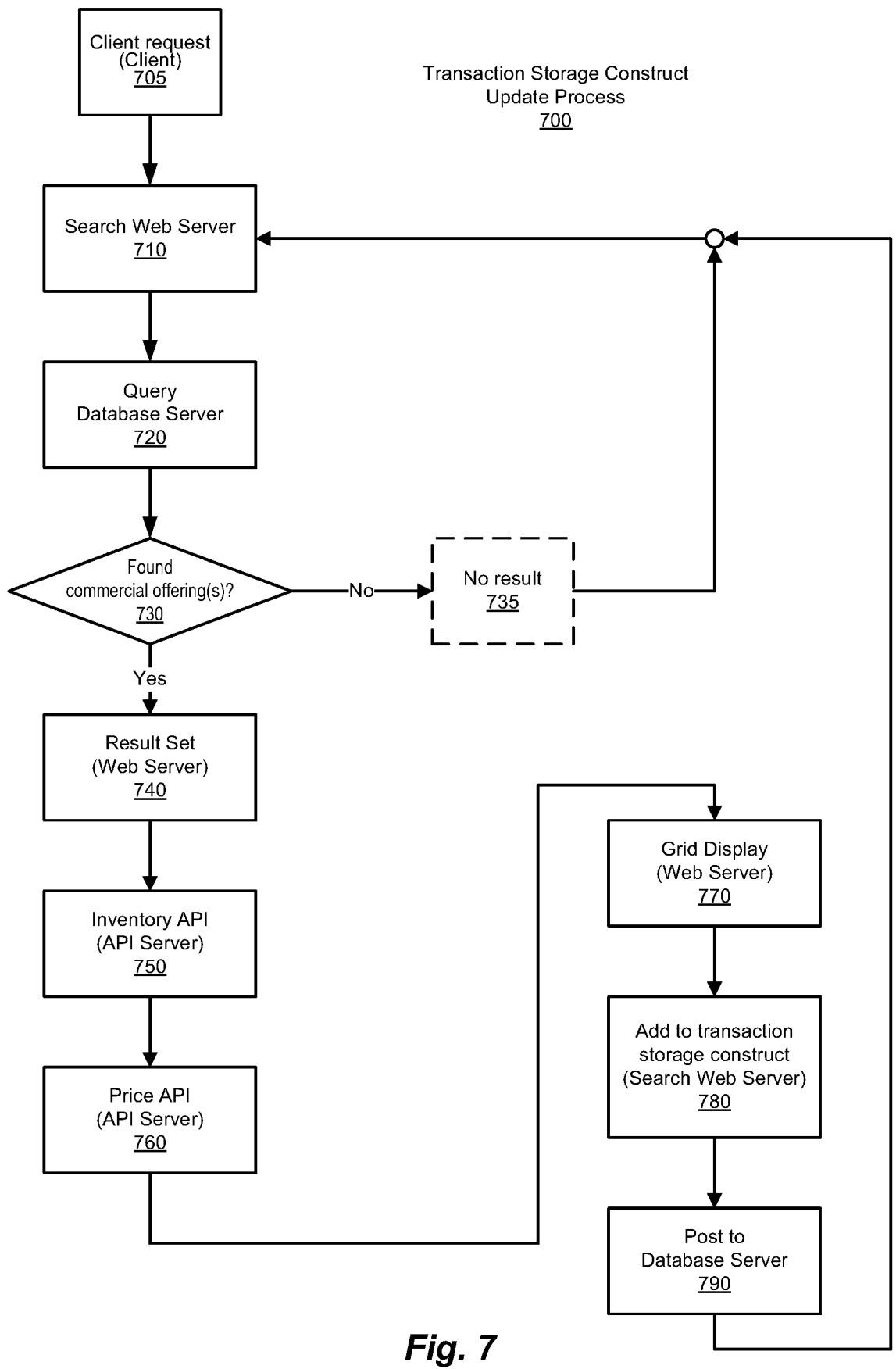
FIG. 7 is a simplified flow diagram illustrating an example of operations performed in identifying one or more items and updating a transaction storage construct therewith, according to methods and systems such as those disclosed herein.

FIG. 7 is a simplified flow diagram illustrating an example of operations performed in identifying one or more items (e.g., commercial offerings such as products, services, product/service systems, and the like) and updating a transaction storage construct therewith, according to methods and systems such as those disclosed herein, such as may be implemented by an architecture such as that depicted in FIG. 6 as server system component interaction diagram 600. That being the case, FIG. 7 depicts a transaction storage construct update process 700. Transaction storage construct update process 700 begins with a client (such as one of user clients 210, client 510, or client 610) sending a request (705). Such a request is received by, for example, a search web server such as search web server 630 (710). Search web server 630 then queries database server 660 (720), which, in turn, queries database 670 for the requisite information. A determination is then made as to whether one or more commercial offering(s) were found by database server 660 in querying database 670. In the case in which such querying did not result in any information (735), transaction storage construct update process 700 returns to a state in which search web server 630 awaits the next client request.

Alternatively, in the case in which such querying resulted in information being found in database 670 by database server 660, transaction storage construct update process 700 proceeds to providing a result set for this information to web server 640 (740). Web server 640 then communicates with API server 650 to access and inventory API, in order to determine the availability of such commercial offering(s) (e.g., products, services, product/service systems, and/or the like) (750). Web server 640 also communicates with API server 652 determine pricing information for the given commercial offering(s) (760). Web server 640, having gathered the requisite information, is now able to generate a grid display of the salient information (770). Upon receipt of a communication indicating the selection of one or more such commercial offering(s) by way of the user interface presented by client 610, such selection can be added to a transaction storage construct by, for example, search web server 630 (780). This operation can then be posted to a database such as database 670 by database server 660, or elements corresponding thereto depicted in FIGS. 2, 3, and 4, for example (790). Transaction storage construct update process 700 then returns to search web server 630 awaiting the next client request (710).

One example of the operations described in connection with transaction storage construct update process 700 can, in the alternative, be described using pseudocode, as appears below. The pseudocode presented captures one embodiment, in which a user's interaction with systems such as server systems 620 of FIG. 6, by way of a client such as client 610, is described in terms of the logical decisions rendered by such systems and the state of the user interface presented to the user thereby.

1. Focus in Search Bar (While user is logged into a given user account)
   a. Pass
      i. Query user search history
         1. Pass
            a. Display search history
               i. On selection go to 2: Search
   b. Fail
      i. Go to 2: Initiate Search Functionality
2. Search Process on Focus (While user is logged into a given user account)
      i. Determine whether term(s) entered in search bar correlates to an actual item
         a. Pass
            i. Display product results in a grid
               1. Product image check
                  a. Pass
                     i. Display product image
                  b. Fail
                     i. Display default image
               2. Product description
                  a. Link to product page
               3. Display price
                  a. Get Price flow chart
               4. Email item information to another user (Modal)
                  a. Form
                     i. First name, validate on submit
                     ii. Last name, validate on submit
                     iii. Postal code
                     iv. Email address, validate on submit
                     v. Recipient email address
                     vi. Message
                     vii. IP address
                     viii. Date/Time
                     ix. Confirmation function
                  b. On Submit display Sent Message
               5. Message item information to another user (Modal)
                  a. Form
                     i. First name, validate on submit
                     ii. Last name, validate on submit
                     iii. Postal code
                     iv. Recipient First Name
                     v. Identifying information (e.g., mobile number), validate on submit
                     vi. Message
                     vii. IP address
                     viii. Date/Time
                     ix. Confirmation function
                     x. On Submit display Sent Message
                  b. On Submit display Sent Message
               6. Add to history
                  a. On button press, add to history and show confirmation modal
               7. Quantity
                  a. Number field (e.g., 1-10000)
               8. Add to transaction storage construct
                  a. On button press check for null quantity
                     2. Go to c: Add to transaction storage construct modal

```
            b. Fail
                i. Go to b. Search for Category
        2. Write search term to database (if 'Enter' is clicked)
    b. Search for Category
        i. Pass
            1. Display category results
                a. On display sub-categories
                    i. Display category name
                    ii. Display view all
                        1. On selection go to category page (use category
                        flow chart)
                b. On Focus check for products in category: Check if user is
                logged in
                    i. Pass
                        1. Display product results in a grid
                            a. Product image check
                                i. Pass
                                    Display product image
                                ii. Fail
                                    Display default image
                            b. Product description
                                i. Link to Product page
                            c. Display price
                                i. Get Price flow chart
                            d. Email item information to another user
                            (Modal)
                                i. Form
                                ii. First name, validate on submit
                                iii. Last name, validate on submit
                                iv. Email address, validate on
                                submit
                                v. postal code
                                Validation check on submit
                                Branch location check
                                vi. Message - Send address to
                                nearest branch
                                vii. IP address
                                viii. Date/Time
                                ix. Confirmation function
                                x. On Submit display Sent Message
                            e. Message item information to another
                            user (Modal)
                                i. Form
                                ii. First name, validate on submit
                                iii. Last name, validate on submit
                                iv. postal code
                                v. Identifying information (e.g.,
                                mobile number), validate on
                                submit
                                vi. Message
                                vii. IP address
                                viii. Date/Time
                                ix. Confirmation function
                                x. On Submit display Sent Message
                            f. ad to history
                                i. On button press, add to history
                                and show confirmation modal
                            g. Quantity
                                i. Number field 1-10000
                            h. Add to Cart
                                i. On button press check for null
                                quantity
                                2. Go to c: Add to transaction
                                storage construct modal
                    ii. Fail
                        1. Display Product Results In a grid
                            a. Product Image check
                                i. Pass
                                    Display product image
                                ii. Fail
                                    Display default image
                            b. Product Description
                                i. Link to Product page
        ii. Fail
            1. Display Nothing Found message (if 'Enter' is clicked)
            c. Add to transaction storage construct modal
                i. Item image
                ii. Item description
                iii. Quantity
                iv. Price
                v. Total
                vi. Transaction storage construct total
                vii. View transaction storage construct
                viii. Continue adding items
```

The following information is an example of the informational fields that can be presented to a user in a user interface dialogue for emailing item information to another user. An example of such a dialogue is presented in FIG. 17, subsequently.

Email Item Information to Another User (Modal)
1. First name, validate on submit
    a. Text-field, 256=<char count.
2. Last name, validate on submit
    a. Text-field, 256=<char count.
3. Email address, validate on submit
    a. Text-field, 256=<char count.
    b. Regular-Expression email validation
4. Postal code
    a. Number, 5-9 char
5. Message
    a. Text-area, 256=<char count.

The following information is an example of the informational fields that can be presented to a user in a user interface dialogue for messaging item information to another user. An example of such a dialogue is presented in FIG. 18, subsequently.

Message Item Information to Another User (Modal)
1. First name, validate on submit
    a. Text-field, 256=<char count.
2. Last name, validate on submit
    a. Text-field, 256=<char count.
3. Mobile number, validate on submit
    a. text-field, 3 char.
    b. text-field, 3 char.
    c. text-field, 4 char.
    d. Regular-Expression number validation
4. Message
    a. Text-area, 256=<char count.

The foregoing pseudocode thus, generally, describes one embodiment of the operations and information involved in an integrated search and selection process in a transactional user interface. Such operations and information are described in greater detail with respect to FIGS. 8-12, subsequently, and are described in connection with user interface dialogues and features thereof, in connection with FIGS. 13-20, subsequently.

Figure 8:
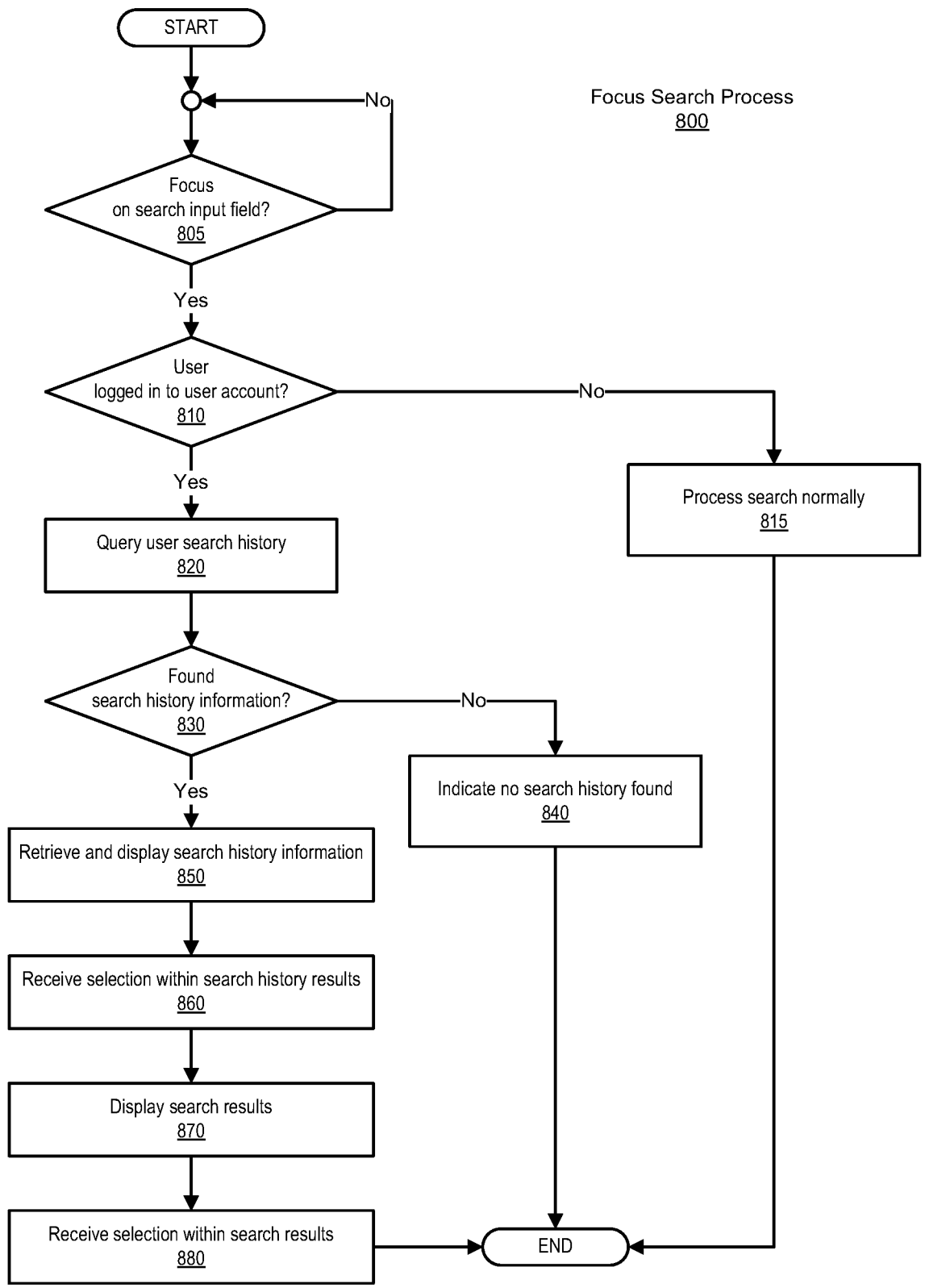
FIG. 8 is a simplified flow diagram illustrating an example of operations performed in a focus search process, according to methods and systems such as those disclosed herein.

FIG. 8 is a simplified flow diagram illustrating an example of operations performed in a focus search process, according to methods and systems such as those disclosed herein. FIG. 8 thus depicts a focus search process 800 that performs operations based on methods and systems such as those described herein, in order to present one or more items for selection, in response to focus on a search field in the user interface of a client computer system such as one of user clients 210, client 510, or client 610. Focus search process 800 begins with a determination as to whether a search input field has received focus (e.g., by way of the user interface's cursor) (805). If the search input field in question is not received focus, focus search process 800 continues to await such indication. Once the search input field in question has received focus, a determination is made as to whether the user in question is logged in to a user account (810). If a determination is made that the user is not logged in, a search request received via the search input field is processed normally (815). Focus search process 800 then concludes.

In the alternative, if the user is logged into a user account, the user's search history is query (820). Such querying can be performed in the manner described in connection with FIGS. 2, 4, 5, and 6, for example. A determination is then made as to whether any search history information has resulted from such query (830). In the case in which no such search history information has been found, an indication to this effect is provided (840). Focus search process 800 then concludes.

In the case in which such querying produces search history information, such search history information is retrieved from one or more of the databases in question and displayed in the user interface presented by the given client (e.g., in the manner described in connection with FIGS. 2, 4, 5, and 6, for example) (850).

At this juncture, the user is able to select one or more of the items thus presented as search history results by way of the user interface (860). Search results produced by such selection can then be displayed (870). In a comparable manner, the user is able to select one or more of the items presented as part of the search results in question, which will be received by the server systems providing such functionality (880). As will be appreciated in light of the present disclosure, the operations associated with using such selections received (860) and searching based on such selections (870) are optional, and so a user is able to simply select one or more items from within search history results initially displayed, in order to identify the items desired. Focus search process 800 then concludes.

Each of the blocks of the flow diagram described above, as well as those described elsewhere herein (and, in fact, operations described as being included in such flow diagrams, taken either individually or in the aggregate), may be executed by a module (e.g., a software module) or a portion of a module or a computer system user using, for example, a computer system such as that described in connection with FIG. 21, subsequently. Thus, the above described method, the operations thereof and modules therefor may be executed on a computer system configured to execute the operations of the method and/or may be executed from computer-readable storage media. The method may be embodied in a machine-readable and/or computer-readable storage medium for configuring a computer system to execute the method. Thus, the software modules may be stored within and/or transmitted to a computer system memory to configure the computer system to perform the functions of the module, for example.

Such a computer system normally processes information according to a program (a list of internally stored instructions such as a particular application program and/or an operating system) and produces resultant output information via I/O devices. A computer process typically includes an executing (running) program or portion of a program, current program values and state information, and the resources used by the operating system to manage the execution of the process. A parent process may spawn other, child processes to help perform the overall functionality of the parent process. Because the parent process specifically spawns the child processes to perform a portion of the overall functionality of the parent process, the functions performed by child processes (and grandchild processes, etc.) may sometimes be described as being performed by the parent process.

Such a computer system typically includes multiple computer processes executing "concurrently." Often, a computer system includes a single processing unit that is capable of supporting many active processes alternately. Although multiple processes may appear to be executing concurrently, at any given point in time only one process is actually executed by the single processing unit. By rapidly changing the process executing, a computer system gives the appearance of concurrent process execution. The ability of a computer system to multiplex the computer system's resources among multiple processes in various stages of execution is called multitasking. Systems with multiple processing units, which by definition can support true concurrent processing, are called multiprocessing systems. Active processes are often referred to as executing concurrently when such processes are executed in a multitasking and/or a multiprocessing environment.

The software modules described herein may be received by such a computer system, for example, from computer readable storage media. The computer readable storage media may be permanently, removably or remotely coupled to the computer system. The computer readable storage media may non-exclusively include, for example, any number of the following: magnetic storage media including disk and tape storage media, optical storage media such as compact disk media (e.g., CD-ROM, CD-R, etc.) and digital video disk storage media, nonvolatile memory storage memory including semiconductor-based memory units such as FLASH memory, EEPROM, EPROM, ROM or application specific integrated circuits; volatile storage media including registers, buffers or caches, main memory, RAM, and the like; and other such computer-readable storage media. In a UNIX-based embodiment, the software modules may be embodied in a file, which may be a device, a terminal, a local or remote file, or other such devices. Other new and various types of computer-readable storage media may be used to store the software modules discussed herein.

Figure 9:
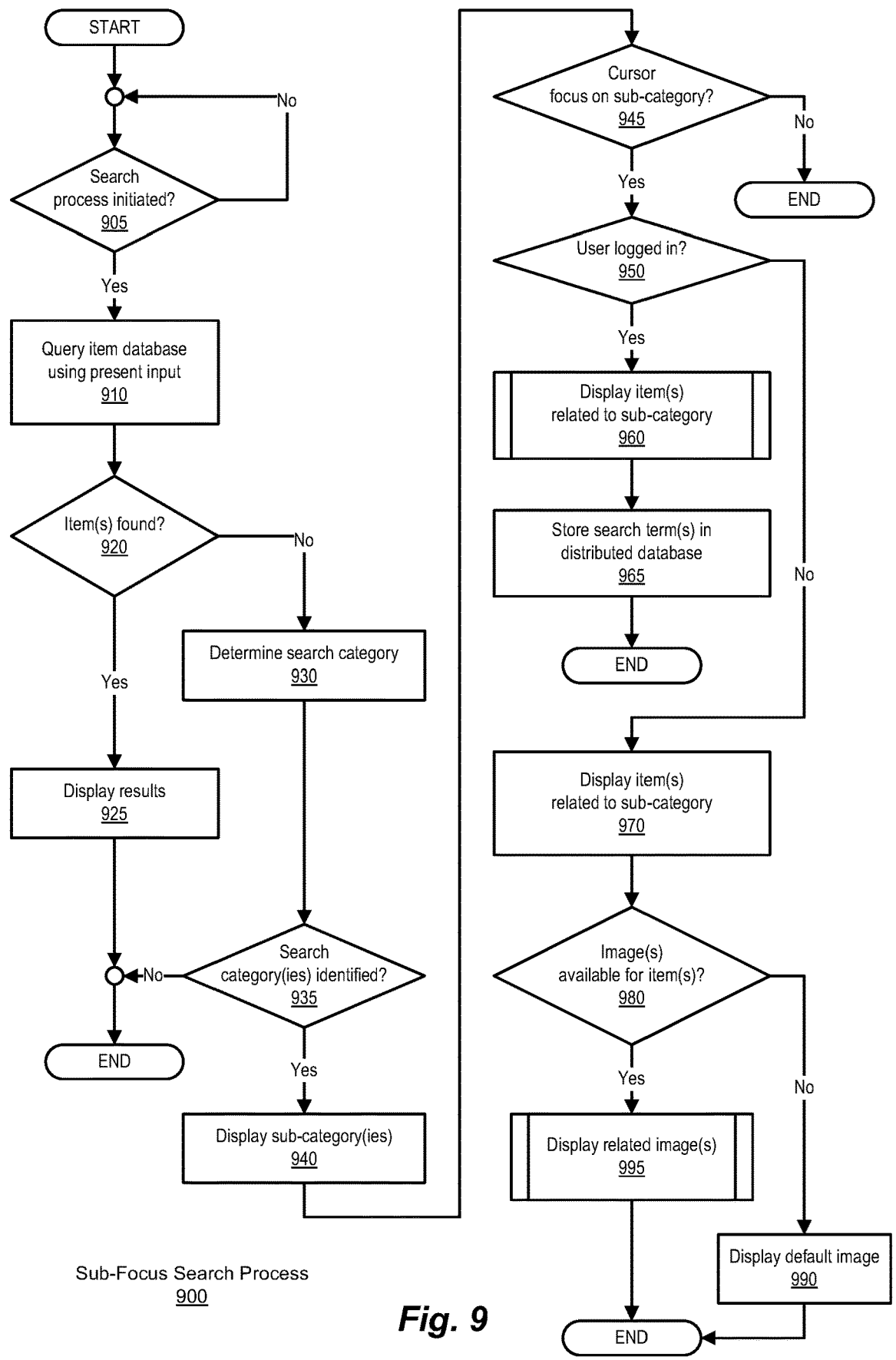
FIG. 9 is a simplified flow diagram illustrating an example of operations performed in a sub-focus search process, supporting a batch mode technique, according to methods and systems such as those disclosed herein.

FIG. 9 is a simplified flow diagram illustrating an example of operations performed in a sub-focus search process, supporting a batch mode technique, according to methods and systems such as those disclosed herein. FIG. 9 thus depicts a sub-focus search process 900. Sub-focus search process 900 begins by awaiting the initiation of a search process (905). Once an indication that a search processes been initiated, an item database is queried using the present input (910). Such an item database can be, for example, a database that includes one or more commercial offering tables, which include information regarding one or more commercial offerings, such as the aforementioned products/services. A determination is then made as to whether the querying in question resulted in the identification of any such items (920). If such items were found, these results are displayed in the user interface of the client effecting such communications (925). The requisite information having been retrieved and displayed, sub-focus search process 900 concludes.

Alternatively, if one or more items are not found (920), a determination is made as to the search category involved (930). A determination is then made as to whether one or more search categories were successfully identified (935). If no search categories were identified, sub-focus search process 900 concludes. Alternatively, if one or more search categories were successfully identified, one or more sub-categories are displayed (940). A determination is then made as to whether cursor focus is on one (or more, depending on the implementation) of the sub-categories (945). If cursor focus is not on any of the sub-categories, sub-focus search process 900 concludes.

In the alternative, if cursor focus is on one (or more, depending on the implementation) of the sub-categories, a determination is made as to whether the user in question is logged in to a user account (950). In the case in which the user is logged into a user account, a process of displaying one or more items related to the sub-category question is performed (960). An example of the operations performed in displaying one or more items related to the sub-category question in this manner is described in greater detail in connection with FIG. 10, subsequently. One or more search terms generated in this manner are then stored in the distributed database (965). Sub-focus search process 900 then concludes.

Returning to the determination as to whether the user is logged into a user account (950), in the case in which the user is not logged into a user account, a process of displaying one or more items related to the sub-category is performed (970). In this case, a determination is made as to whether one or more images are available for the item or items in question (980). As will be appreciated in light of the present disclosure, while visual information regarding a given item is described herein as an item image, such item image can in fact be any visual representation sufficient to connote or otherwise represent the item in question. In the case in which no such images are available, a default image is displayed in the user interface of the client in question (990). Alternatively, one or more images related to the items in question can be displayed (995). An example of a process for displaying images related to the item(s) in question in this manner is described in greater detail in connection with FIG. 12, subsequently. As before, sub-focus search process then concludes.

Figure 10:
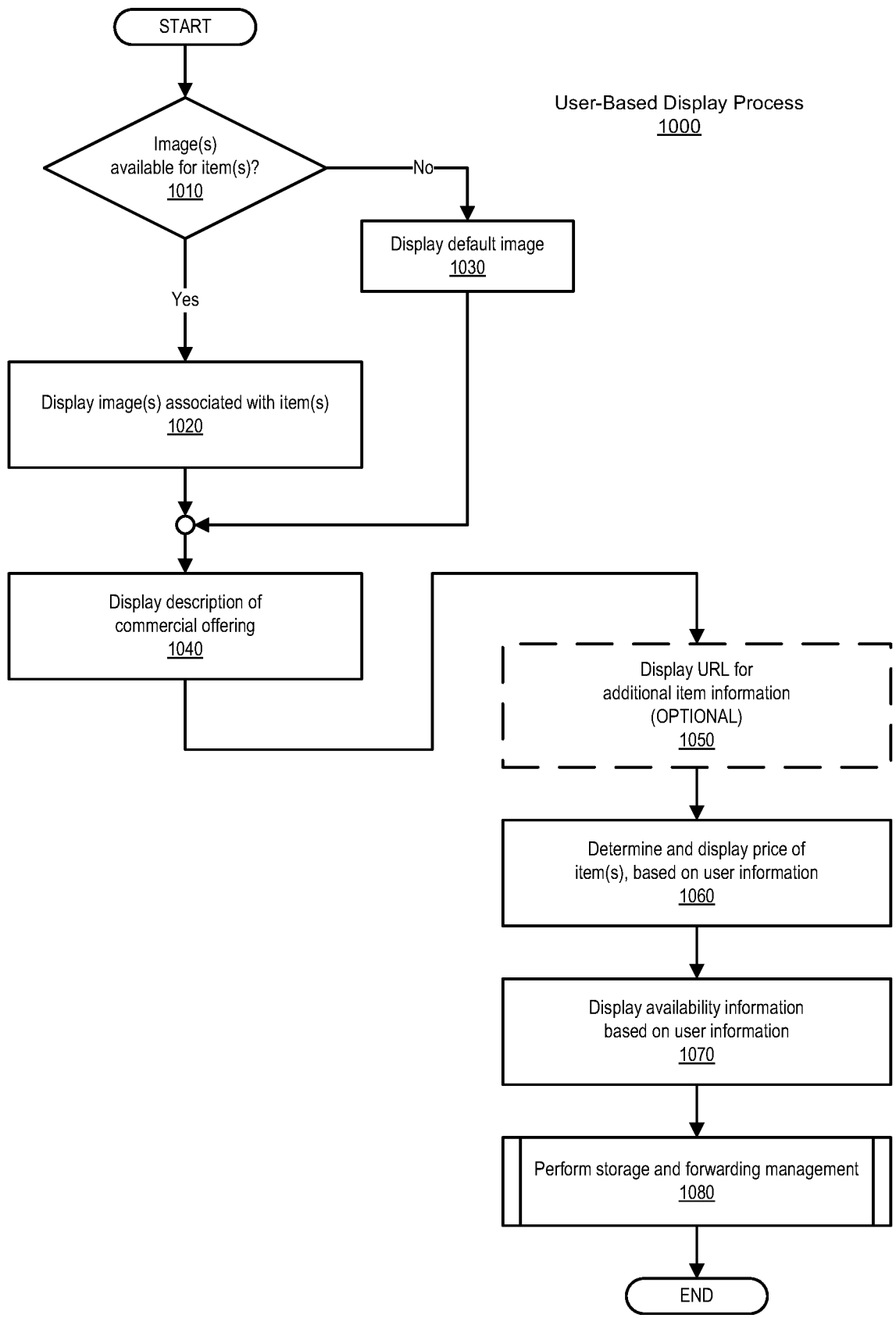
FIG. 10 is a simplified flow diagram illustrating an example of operations performed in a user-based display process, according to methods and systems such as those disclosed herein.

FIG. 10 is a simplified flow diagram illustrating an example of operations performed in a user-based display process, according to methods and systems such as those disclosed herein. Such a user-based display process is depicted in FIG. 10 as a user-based display process 1000. User-based display process 1000 begins with a determination as to whether one or more images are available for the item(s) in question (1010). If the requisite image(s) are available, the image(s) associated with the item(s) in question is (are) displayed (1020). Alternatively, one or more default images are displayed (1030).

Next, a description associated with each of the one or more items is displayed (1040). At this juncture, a universal resource locator (URL; colloquially known as a "link") can optionally be displayed, to allow the user to view additional information regarding the item (1050). At this point, a price for each such item can be determined and displayed in the user interface, for consideration by the user (1060). Availability information (e.g., based on user information associated with the user account in question) can be displayed (1070). As will be appreciated in light of the present disclosure, information regarding the item(s) in question (e.g., item price and item availability) can be made to depend on the given user account in question (and so, the user), allowing a provider of such items using methods and systems such as those described herein to tailor such information to the particular users of such functionalities. For example, a user-based display process such as user-based display process 1000 can take into consideration user characteristics such as historical volume, historical frequency, agreed-upon pricing and availability structures, and other such parameters, when presenting such information to those accessing such systems. Storage and forwarding management can then be performed (1080). An example of a storage and forwarding process in this manner is described in greater detail in connection with FIG. 11, subsequently. User-based display process 1000 then concludes.

Figure 11:
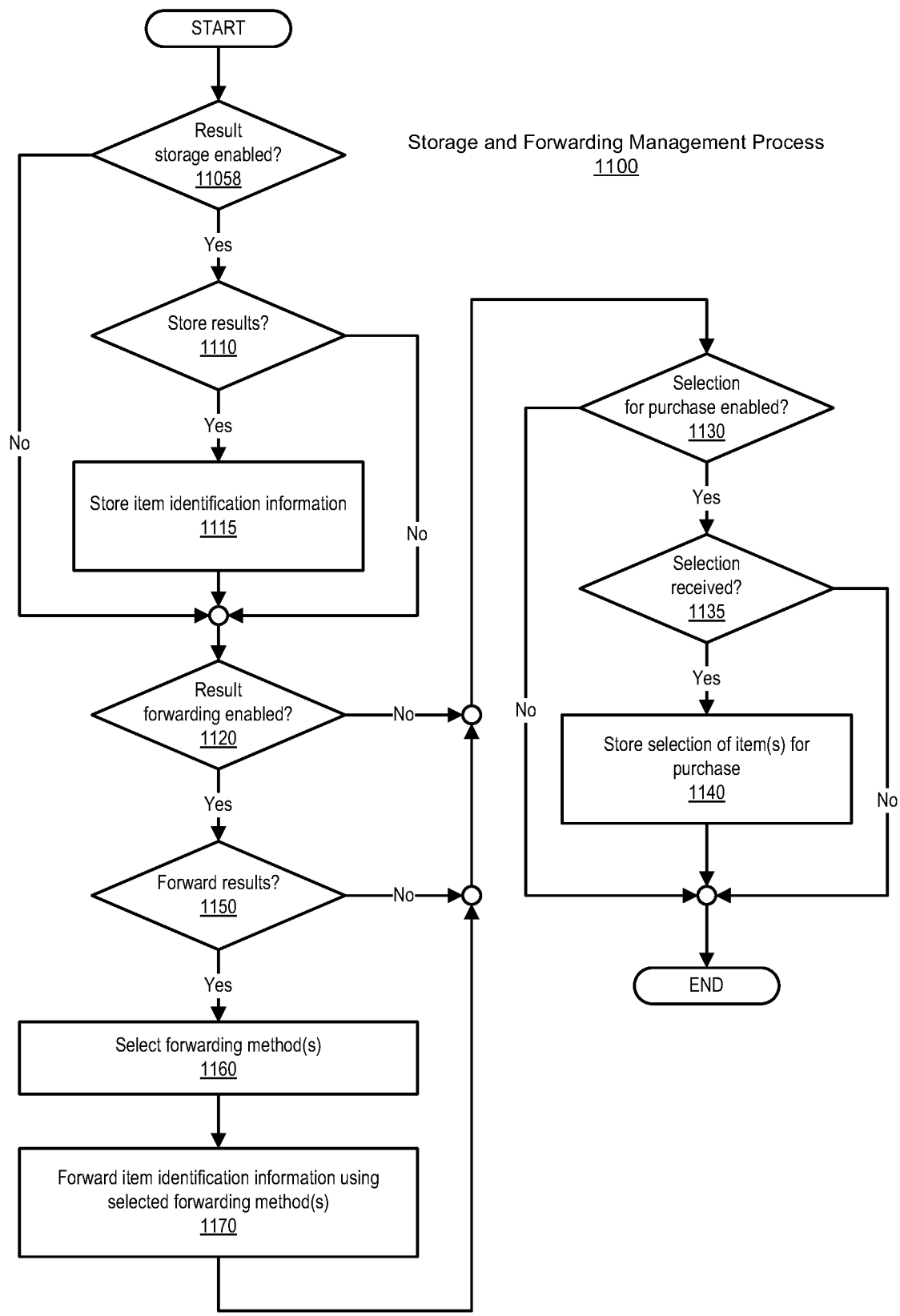
FIG. 11 is a simplified flow diagram illustrating an example of operations performed in a storage and forwarding management process, according to methods and systems such as those disclosed herein.

FIG. 11 is a simplified flow diagram illustrating an example of operations performed in a storage and forwarding management process, according to methods and systems such as those disclosed herein. Storage and forwarding management, such as that noted in connection with FIG. 10, can be accomplished, for example, by a process such as a storage and forwarding management process 1100, as depicted in FIG. 11. Storage and forwarding management process 1100 begins with a determination as to whether search result storage is enabled (1105). If search result storage is enabled, a determination as to whether the present search results should be stored (1110). In the case in which such search results should be stored, identification information for (and, optionally, other information regarding) the item(s) in question is stored (1115). As depicted in FIG. 11, if search result storage is not enabled (1105) or the search results are not to be stored (1110), the search results are not stored, and storage and forwarding management process 1100 proceeds to the next operation.

Next, a determination is made as to whether search result forwarding is enabled (1120). In the case in which search result forwarding is enabled, a determination is made as to whether the search results are to be forwarded (1150). In the case in which the search results in question are to be forwarded, one or more forwarding methods are selected by the user via, for example, the user interface presented by the client computing system (1160). The item identification information (and/or other related information) is then forwarded to the desired recipient(s) using the selected forwarding method(s) (1170). Storage and forwarding management process 1100 then proceeds to a determination as to whether purchase of the item(s) has been enabled (1130). If search result forwarding is not enabled (1120) or search results are not to be forwarded (1150), storage and forwarding management process 1100 also proceeds to a determination as to whether purchase of the item(s) has been enabled (1130).

If purchase of the item(s) has been enabled (1130), a determination is made as to whether a selection of one or more items has been received (1135). If such a selection has been received, purchase of the selection is recorded (1140). Storage and forwarding management process 1100 then concludes. Alternatively, if selection purchase has not been enabled (1130) or know items are selected (1135), no such action is taken, and storage and forwarding management process 1100 concludes.

Figure 12:
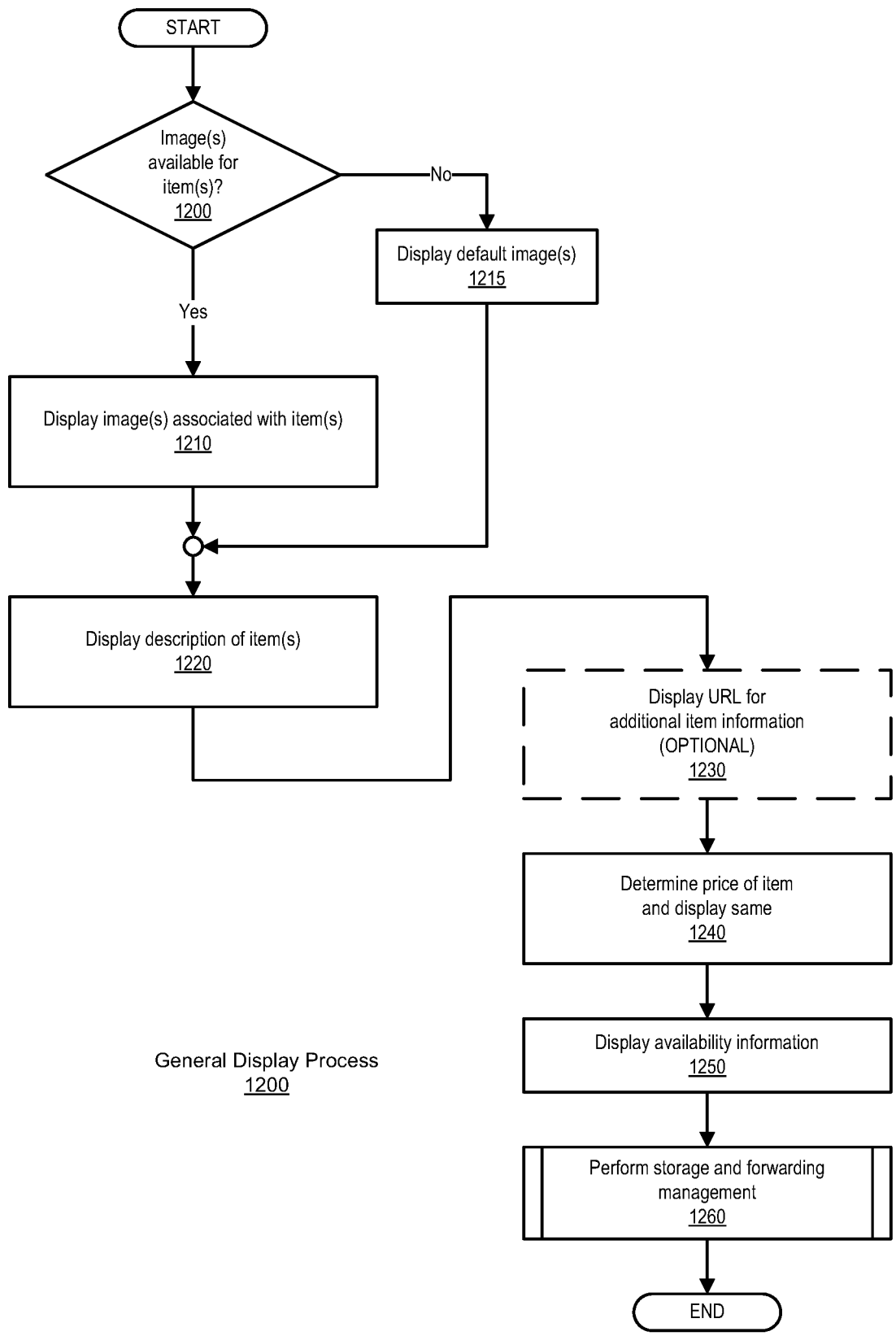
FIG. 12 is a simplified flow diagram illustrating an example of operations performed in a general display process, according to methods and systems such as those disclosed herein.

FIG. 12 is a simplified flow diagram illustrating an example of operations performed in a general display process, according to methods and systems such as those disclosed herein. In contrast to user-based display process 1000, FIG. 12 depicts a display process that is generic in nature, and so is depicted in FIG. 12 as a general display process 1200. General display process 1200 begins with a determination as to whether images for the item(s) in question are available (1205). If such images are available, those images are displayed (1210). Alternatively, if no such images are available, one or more default images are displayed (1215). In either case, a description of each of the items in question is displayed (1220). Next (optionally), a URL for additional item information can be displayed (1230). A general price for each of the items in question is then determined and displayed (1240). Such general pricing can be, for example, the pricing available to the public, sans any special arrangements or historical purchasing behavior. In the same manner, availability information for each of the items is then displayed (1250). Again, such availability information can be, for example, that which is available to the public, sans any special arrangements or historical purchasing behavior. As before, with regard to user-based display process 1000, general display process 1200 then proceeds to performing storage and forwarding management (1260). In that regard, reference is again made to storage and forwarding management process 1100, as described in greater detail in connection with FIG. 11, previously. General display process 1200 then concludes.

Example of User Interface Features for Integrated Search and Selection

Figure 13:
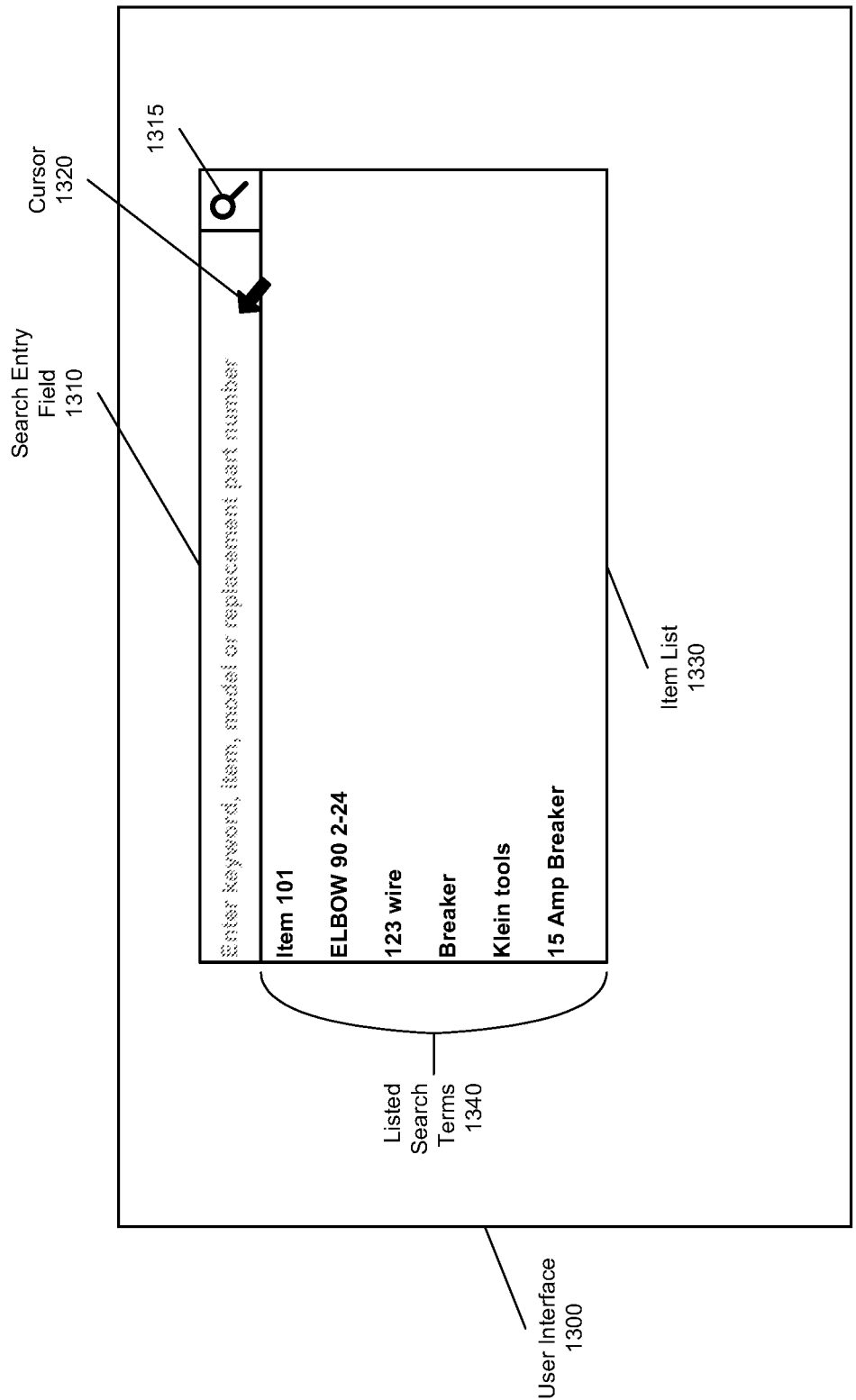
FIG. 13 is a simplified diagram illustrating an example of a user interface dialogue depicting focusing on a search bar, according to methods and systems such as those disclosed herein, and the resulting presentation of potentially-selectable items.

FIG. 13 is a simplified diagram illustrating an example of a user interface dialogue depicting focusing on a search bar, according to methods and systems such as those disclosed herein, and the resulting presentation of potentially-selectable items such as products, services, product/service systems, and other such commercial offerings. Shown in FIG. 13 is a user interface 1300 that is designed to implement methods and systems such as those described herein. User interface 1300 includes a search entry field 1310. Search entry field 1310 (also referred to herein as a "search bar") is designed to present functionality such as that described in connection with focus search process 800 of FIG. 8, as is indicated by a search symbol 1350 that appears in a right-hand portion of the search bar. That being the case, upon a user of user interface 1300 "mousing over," for example, search entry field 1310 (and so, search entry field 1310 receiving focus by way of a cursor 1320 moving into search entry field 1310), an item list 1330 is presented in user interface 1300.

As shown in FIG. 13, item list 1330 includes a listing of one or more items and/or search terms (depicted in FIG. 13 as listed search terms 1340). As will be appreciated in light of the present disclosure, listed search terms 1340 are depicted as such in order to lay the groundwork for subsequent discussions regarding embodiments in which terms such as listed search terms 1340 are used perform subsequent searches. As will also be appreciated, listed search terms 1340 can include specific products/services, in order to allow for the direct selection of such items by the user. That being the case, and as in the manner depicted in connection with focus search process 800, for example, one or more of listed search terms 1340 can be selected by the user of user interface 1300. To this end, and as discussed previously, such a user's selection of one or more of listed search terms 1340 can result in, for example, such selected item(s) being searched, or in the more direct manner noted, in the addition of such selected item(s) to the appropriate transaction storage construct, as has been discussed in greater detail with respect to transaction storage construct update process 700 of FIG. 7.

Figure 14:
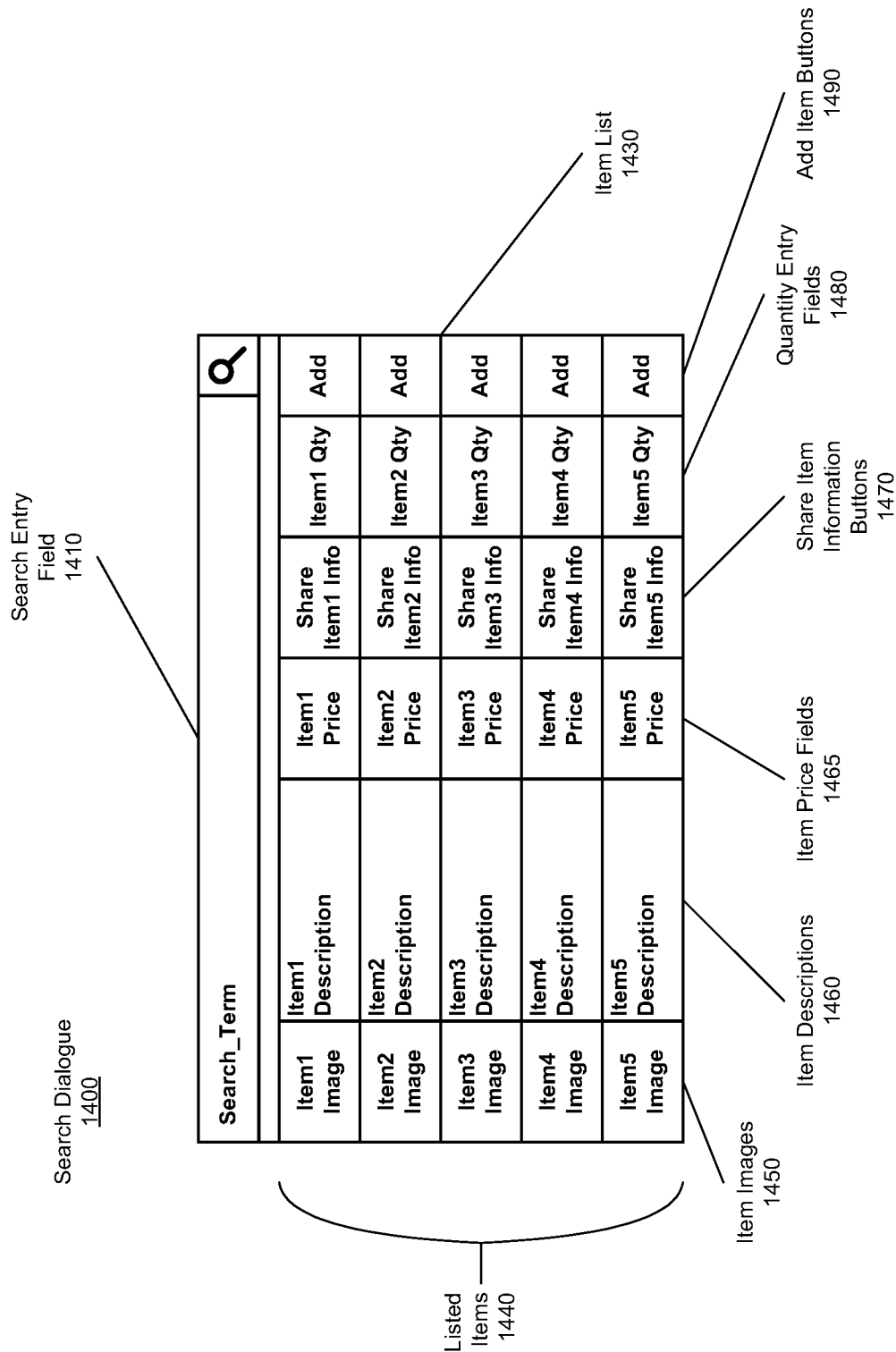
FIG. 14 is a simplified diagram illustrating an example of a user interface dialogue depicting the display of results in a search bar, according to methods and systems such as those disclosed herein.

FIG. 14 is a simplified diagram illustrating an example of a user interface dialogue depicting the display of results in a search bar, according to methods and systems such as those disclosed herein. That being the case, FIG. 14 depicts a search dialog 1400. Search dialog 1400, as its name implies, includes a search entry field 1410 in which a search term can be entered (e.g., in the example depicted in FIG. 14, the search term "Search_Term"). In the example depicted in FIG. 14, the example search term provided ("Search_Term") is associated with a number of items (e.g., Item1, Item2, Item3, Item4, and Item5), which are the result of a search for that example search term initiated by the user. Such might be the case, for example, where the user has selected "Search_Term" from a number of search terms listed (e.g., such as listed search terms 1340 of FIG. 13). Information regarding the aforementioned items is provided in an item list 1430, which includes a number of listed items (depicted in FIG. 14 as listed items 1440). For each of the items listed in item list 1430, information regarding each such item and actions that can be taken in such regard are presented. Such information includes item images 1450, item descriptions 1460, item price fields 1465, share item information buttons 1470, quantity entry fields 1480, and add item buttons 1490.

As will be appreciated in light of the present disclosure, information regarding each item thus presented can include an image of the item in question (e.g., as may be presented as item images 1450), a description of the item in question (e.g., as may be presented as item descriptions 1460), and item prices (e.g., as may be presented in item price fields 1465). As noted in connection with user-based display process 1000 and general display process 1200, item prices presented in item price fields 1465 can be tailored to the user employing the user interface. Further and with regard to the aforementioned processes, the availability (and so, potentially, presentation) of one or more items resulting from (or associated with) the given search term can also be tailored to the user in question by methods and systems such as those described herein.

Share item information buttons 1470 allow the user to provide an indication that information regarding one or more items in item list 1430 is to be shared with another individual, by way of, for example, electronic mail ("email") and/or other types of inter-user messaging functionality. Examples of such information sharing channels are described in connection with storage and forwarding management process 1100 of FIG. 11, and examples of user interface components for presenting such functionality to a user are discussed in connection with FIGS. 17 and 18, subsequently.

Quantity entry fields 1480 allow a user to enter (or, in certain embodiments, select) a desired quantity of the item in question. As noted in connection with item price fields 1465, the allowable quantities the user is permitted to enter in (or select from) quantity entry fields 1480 may be controlled based on characteristics of the user and/or the user's organization, in a manner such as that previously described.

Once the user has indicated the quantity of item(s) by way of quantity entry fields 1480, the user is then able to add the item(s) to the user's transaction storage construct, in the manner described in connection with transaction storage construct update process 700 of FIG. 7. As will be appreciated, once the user's transaction storage construct has been updated thusly, the user can proceed to completing the transaction in question, or can continue with the search for, selection of, and recordation of additional items.

In supporting the aforementioned functionality, components such as those described in connection with FIG. 6 create item list 1430 (also referred to herein as a search drop-down) as a grid using the results of searching performed in the manner described previously. In so doing, methods and systems such as those described herein can create a search drop-down that results in a grid of information such as that appearing in search dialog 1400. As depicted in FIG. 14, each row of such results includes, for example, an item image, a short description, an item price, an item quantity (the quantity of items available in inventory, for example), the quantity of items desired, and an add button (selectable by the user, and functioning to add the desired quantity of items to the transaction storage construct). Functionally, such an add button can be implemented using a JavaScript AJAX call to an API (e.g., API server 650), for example, using the following structure:

/addproducttoTSC/catalog/{productid}/1/{quantity}

The backend of the API call performs the functions needed to add an item to the transaction storage construct. The API then returns the results (including any errors) to a popup in the window. The API call is used with the same structure anywhere an item is added to the transaction storage construct. The JavaScript code that calls this URL (urlAdd) can be implemented, for example, in the following manner:

```
addTSCItem: function (urlAdd) {
  if (TSC.activeCall) {
    return;
  }
  TSC.setActive(true);
  $.ajax({
    cache: false,
    url: urlAdd,
    type: 'post',
    success: this.addSuccess,
    error: this.addFail
  });
};
```

The results popup is handled elsewhere in the code.

Figure 15:
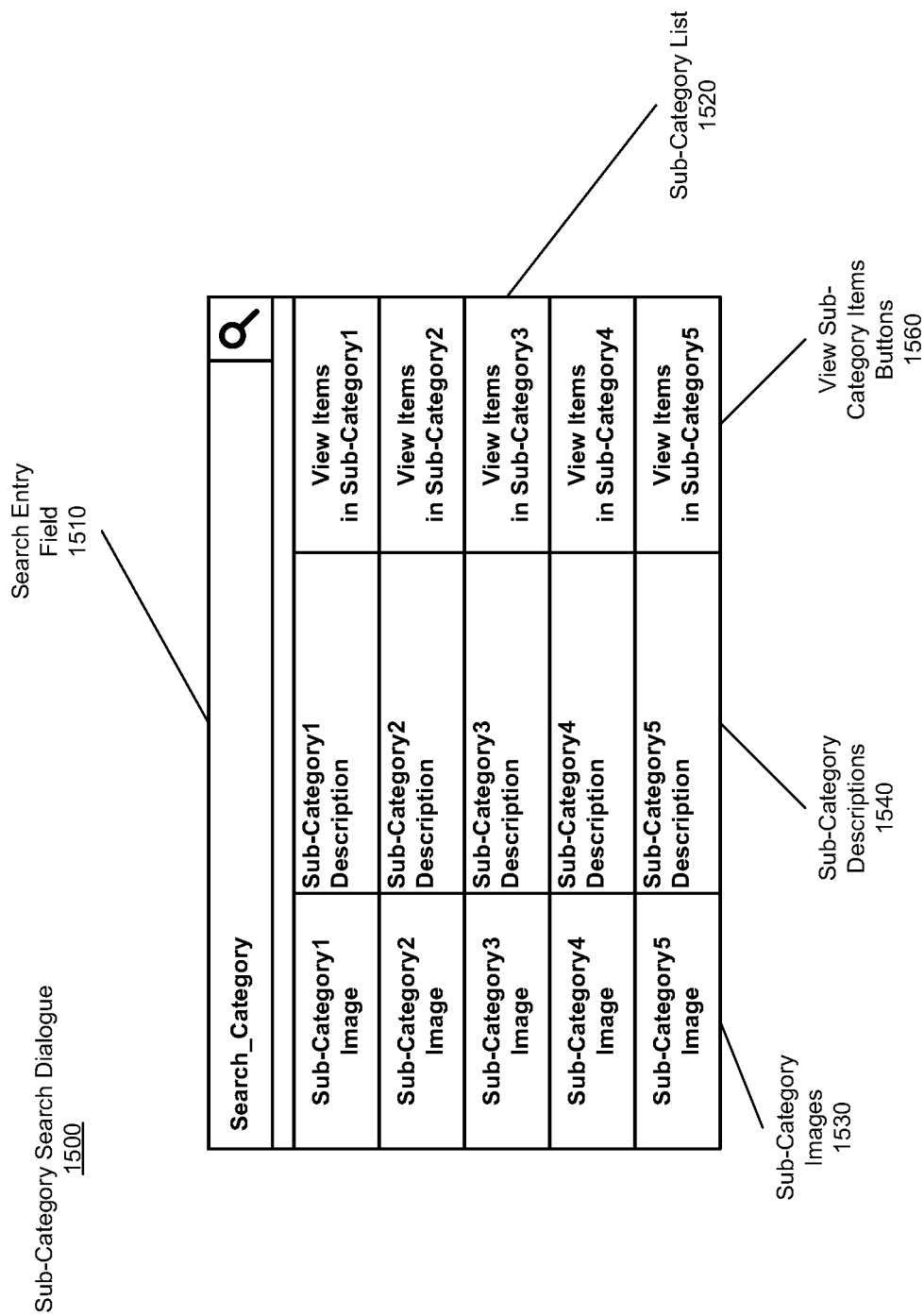
FIG. 15 is a simplified diagram illustrating an example of a user interface dialogue depicting the display of subcategories in a search bar, according to methods and systems such as those disclosed herein, such as that depicted in FIG. 14.

FIG. 15 is a simplified diagram illustrating an example of a user interface dialogue depicting the display of subcategories in a search bar, according to methods and systems such as those disclosed herein, such as that depicted in FIG. 14. That being the case, FIG. 15 depicts a sub-category search dialog 1500. As discussed in connection with sub-focus search process 900, sub-category search dialog 1500 presents a number of sub-categories in response to a search category (depicted in FIG. 15 as, for example, "Search_Category") being entered in a search entry field 1510. Such entry results in the presentation of a sub-category list 1520. For each sub-category listed in sub-category list 1520, information for each such sub-category is presented. Such sub-category information can include images for each sub-category (depicted, for example, in FIG. 15 as sub-category images 1530) and descriptions of each sub-category (depicted, for example, in FIG. 15 as sub-category descriptions 1540).

As may be the case, the user may desire presentation of information regarding one or more of the items in a given sub-category. To this end, sub-category search dialog 1500 presents one or more user interface buttons, in order to allow the user to do so. Examples of such buttons are depicted in sub-category search dialog 1500 as view sub-category items buttons 1560. Further in this regard, in certain embodiments, selection of one of the buttons of view sub-category items buttons 1560 results in the display of one or more items in the selected sub-category, in the manner of search dialog 1400. Alternatively, such selection can cause navigation to a segment of the user interface (e.g., such as a web page) listing such items in a more traditional manner.

Figure 16:
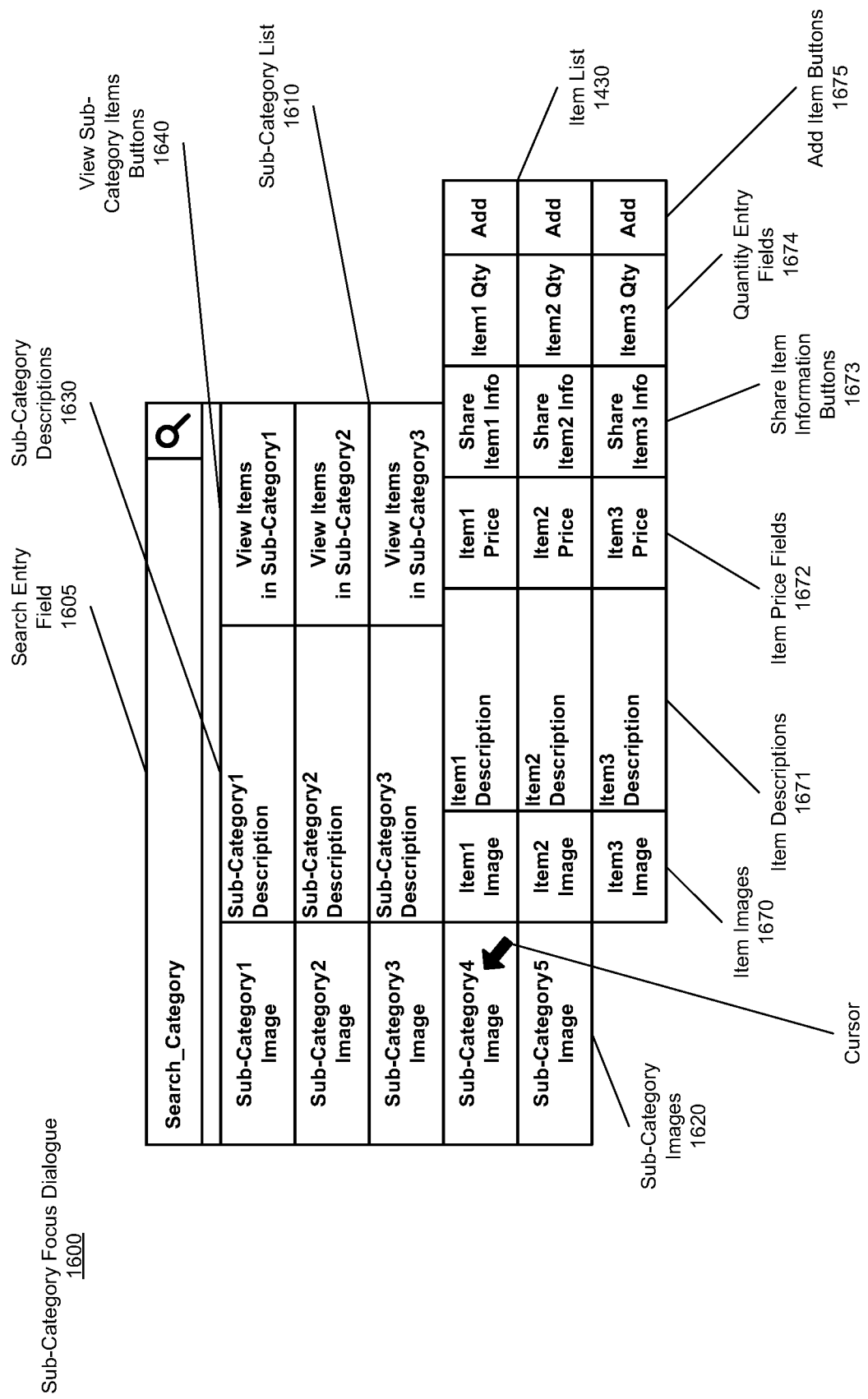
FIG. 16 is a simplified diagram illustrating an example of a user interface dialogue depicting the display of subcategories resulting from the focus on an item (such as by a cursor), according to methods and systems such as those disclosed herein.

FIG. 16 is a simplified diagram illustrating an example of a user interface dialogue depicting the display of subcategories resulting from focus received by a screen element such as a sub-category (e.g., as by a cursor) displayed as part of a sub-category search dialog such as sub-category search dialog 1500 of FIG. 15, according to methods and systems such as those disclosed herein. As noted above, as well as in connection with user interface 1300 of FIG. 13, cursor focus can be used to cause a user interface to present information associated with a screen element. In the example presented in FIG. 16, a sub-category focused dialogue 1600 is depicted. As with sub-category search dialog 1500, sub-category focused dialogue 1600 includes a search entry field 1605, and entry in which has resulted in the presentation of a list of sub-categories (depicted in FIG. 16 as sub-category list 1610). As before, with regard to sub-category search dialog 1500, sub-category list 1610 includes a number of fields, including, for example, sub-category images 1620, sub-category descriptions 1630, and view sub-category items buttons 1640. Sub-category images 1620, sub-category descriptions 1630, and view sub-category items buttons 1640 operate, in general, in a manner comparable to corresponding screen elements in sub-category search dialog 1500. However, when focus shifts to one of the entries in sub-category list 1610, as by a cursor 1650 hovering thereon, an item list 1660 with entries corresponding to one or more of the items in the given sub-category are displayed. As before, in connection with the presentation of items in item list 1430 of search dialog 1400 in FIG. 14, item list 1660 can include a number of comparable fields and controls, including, for example, item images 1670, item descriptions 1671, item price fields 1672, share item information buttons 1673, quantity entry fields 1674, and add item buttons 1675. These fields and controls function in a manner comparable to that described in connection with search dialog 1400. Processes such as those described earlier herein can be used to effect such functionality, and so include sub-focus search process 900, user-based display process 1000, storage and forwarding management process 1100, and general display process 1200, in the manner described in connection with each.

FIG. 17 is a simplified diagram illustrating an example of a user interface dialogue depicting a dialogue that allows a user to share information regarding an item (e.g., a commercial offering such as a product) via email, according to methods and systems such as those disclosed herein. That being the case, FIG. 17 depicts an email dialogue 1700, which can be presented as part of performing a process such as storage and forwarding management process 1100 of FIG. 11. Email dialogue 1700 includes information regarding the given item, such as an item image 1710, an item title 1720, and an item description 1730. For the sender of such information, email dialogue 1700 can also include a first name field 1740, a last name field 1742, and a postal code field 1744, as well as a sender email address field 1746. Similarly, recipient information can also be provided, and can include, for example, email address information in a recipient email address field 1750. Additionally, email dialogue 1700 can allow for message information to be entered, and so accompany information regarding the item in question, which can be entered into a message area 1760 of email dialogue 1700.

Figure 18:
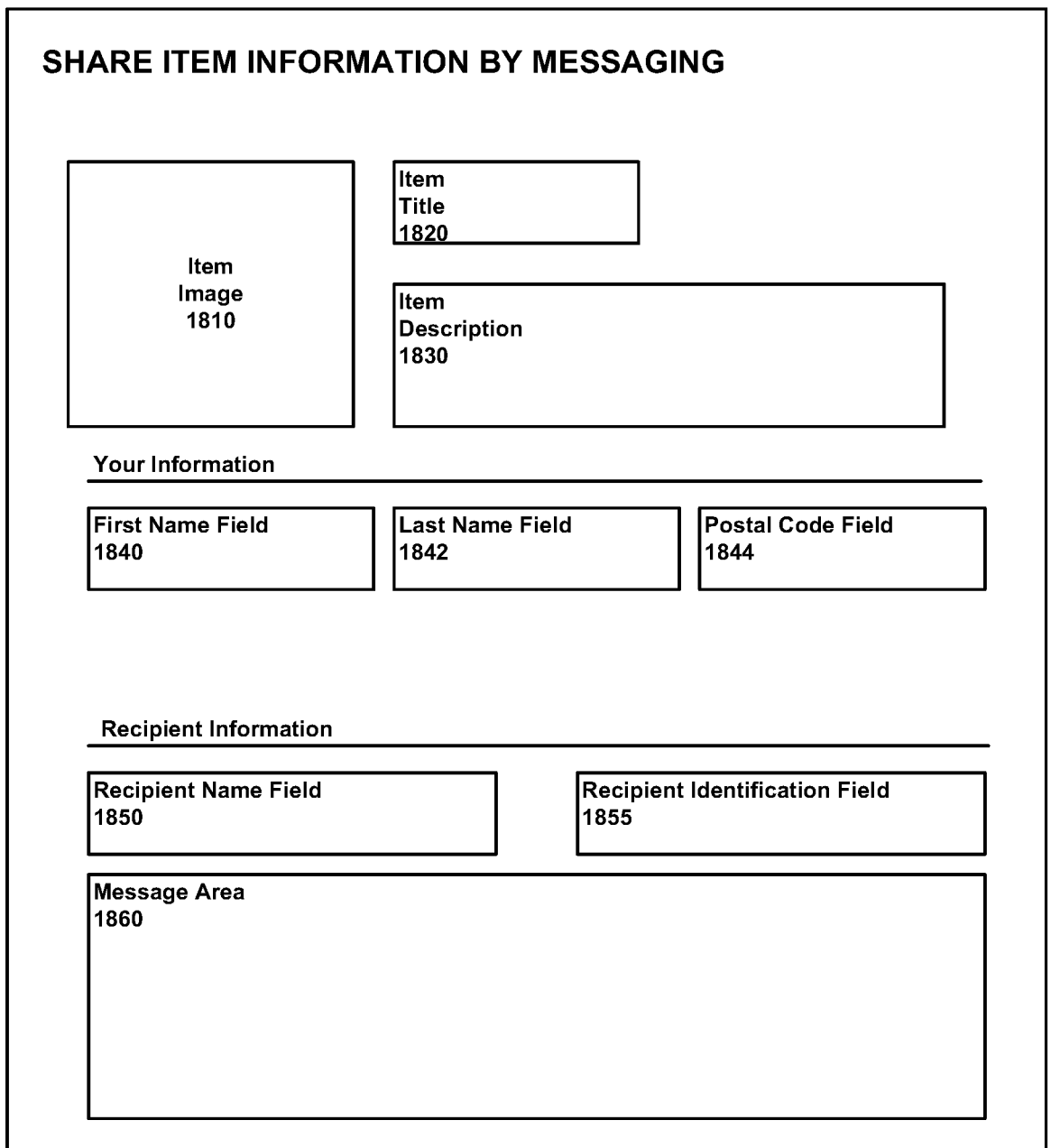
FIG. 18 is a simplified diagram illustrating an example of a user interface dialogue depicting a dialogue that allows a user to share information regarding an item (e.g., a commercial offering) via a messaging function (e.g., as by an SMS message, such as a text message), according to methods and systems such as those disclosed herein.

FIG. 18 is a simplified diagram illustrating an example of a user interface dialogue depicting a dialogue that allows a user to share information regarding an item (e.g., a commercial offering such as a product) via a messaging function (e.g., as by an SMS message, such as a text message), according to methods and systems such as those disclosed herein. That being the case, FIG. 18 depicts a message dialogue 1800, which can be presented as part of performing a process such as storage and forwarding management process 1100 of FIG. 11. Message dialogue 1800 includes information regarding the given item, such as an item image 1810, an item title 1820, and an item description 1830. For the sender of such information, message dialogue 1800 can also include a first name field 1840, a last name field 1842, and a postal code field 1844. Similarly, recipient information can also be provided, and can include, for example, recipient information in a recipient name field 1850 and a recipient identification field 1855. Information regarding the recipient entered into recipient identification field 1855 can be, for example, a phone number, a social media website username, or other information identifying the recipient (or group of recipients). Additionally, message dialogue 1800 can allow for message information to be entered, and so accompany information regarding the item in question, which can be entered into a message area 1860 of email dialogue 1800.

Figure 19:
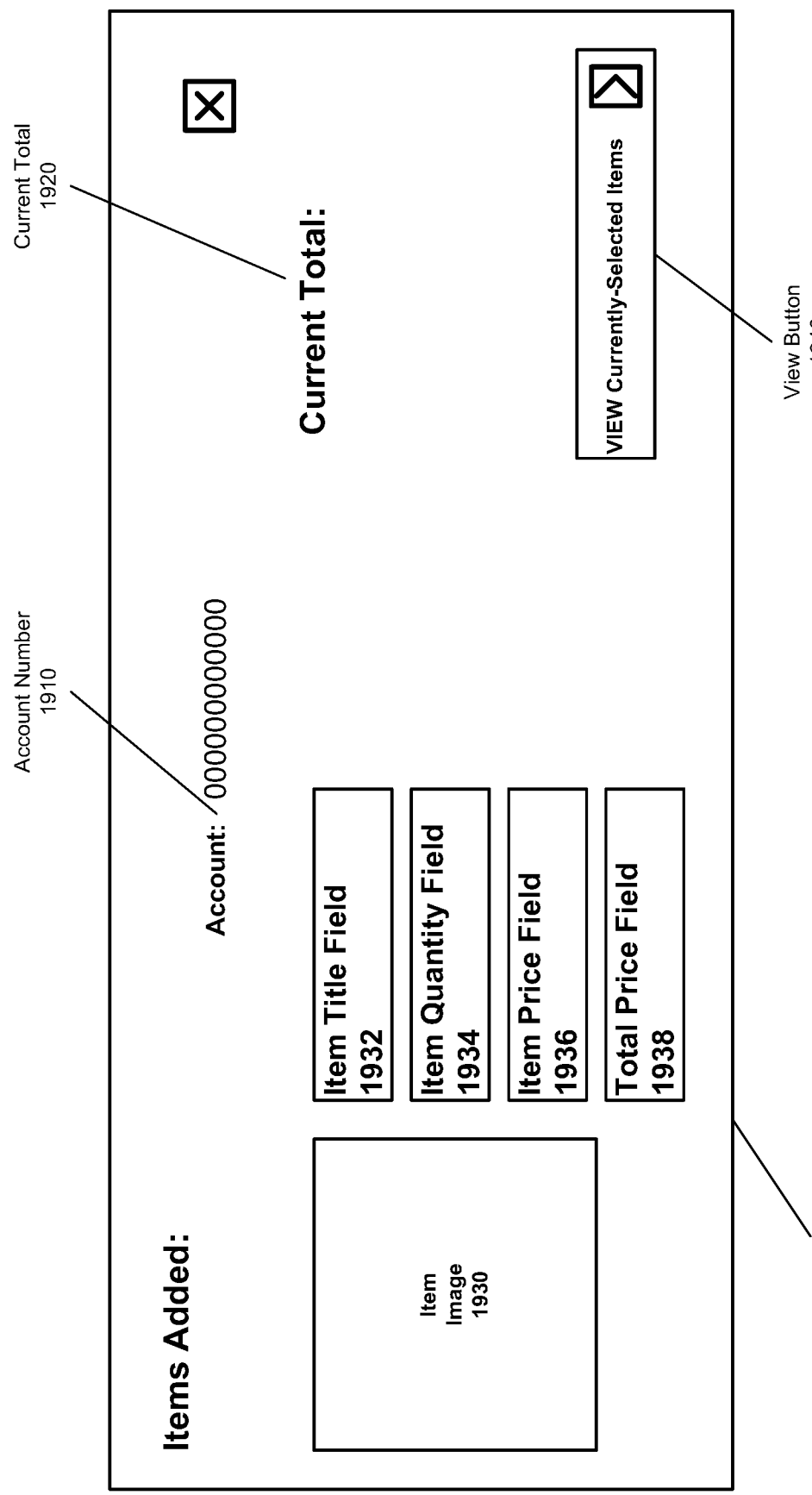
FIG. 19 is a simplified diagram illustrating an example of a user interface dialogue depicting a dialogue reflecting the inclusion of an item in a transactional storage construct, according to methods and systems such as those disclosed herein.

FIG. 19 is a simplified diagram illustrating an example of a user interface dialogue depicting a dialogue reflecting the inclusion of an item such as a commercial offering in a transactional storage construct, according to methods and systems such as those disclosed herein. That being the case, FIG. 19 depicts a transaction storage construct dialogue 1900. Transaction storage construct dialogue 1900 can be presented to a user in the aforementioned user interface as part of, for example, adding the one or more items to the transaction storage construct in question. A dialogue such as transaction storage construct dialogue 1900 may be presented, for example, as part of a client computer's interaction with a search web server such as search web server 630, in performing operations such as those depicted in FIG. 7 (and more specifically, as operation 780). That being the case, and in harmony with such foregoing architectural and flow diagrams, transaction storage construct dialogue 1900 can present information regarding the user and current state of the transaction storage construct, as well as information regarding the item(s) added to the transaction storage construct in question. Such information can include a user's account number (depicted in FIG. 19 as an account number 1910) and a current total 1920. Information regarding the item(s) in question can include an item image 1930, information in an item title field 1932, a quantity of the given item in an item quantity field 1934, a price of the given item in an item price field 1936, and the total price of such items in a total price field 1938. Further, transaction storage construct dialogue 1900 can include a view button 1940, in order to allow the user to view one or more items that are currently selected and stored in the transaction storage construct.

Figure 20:
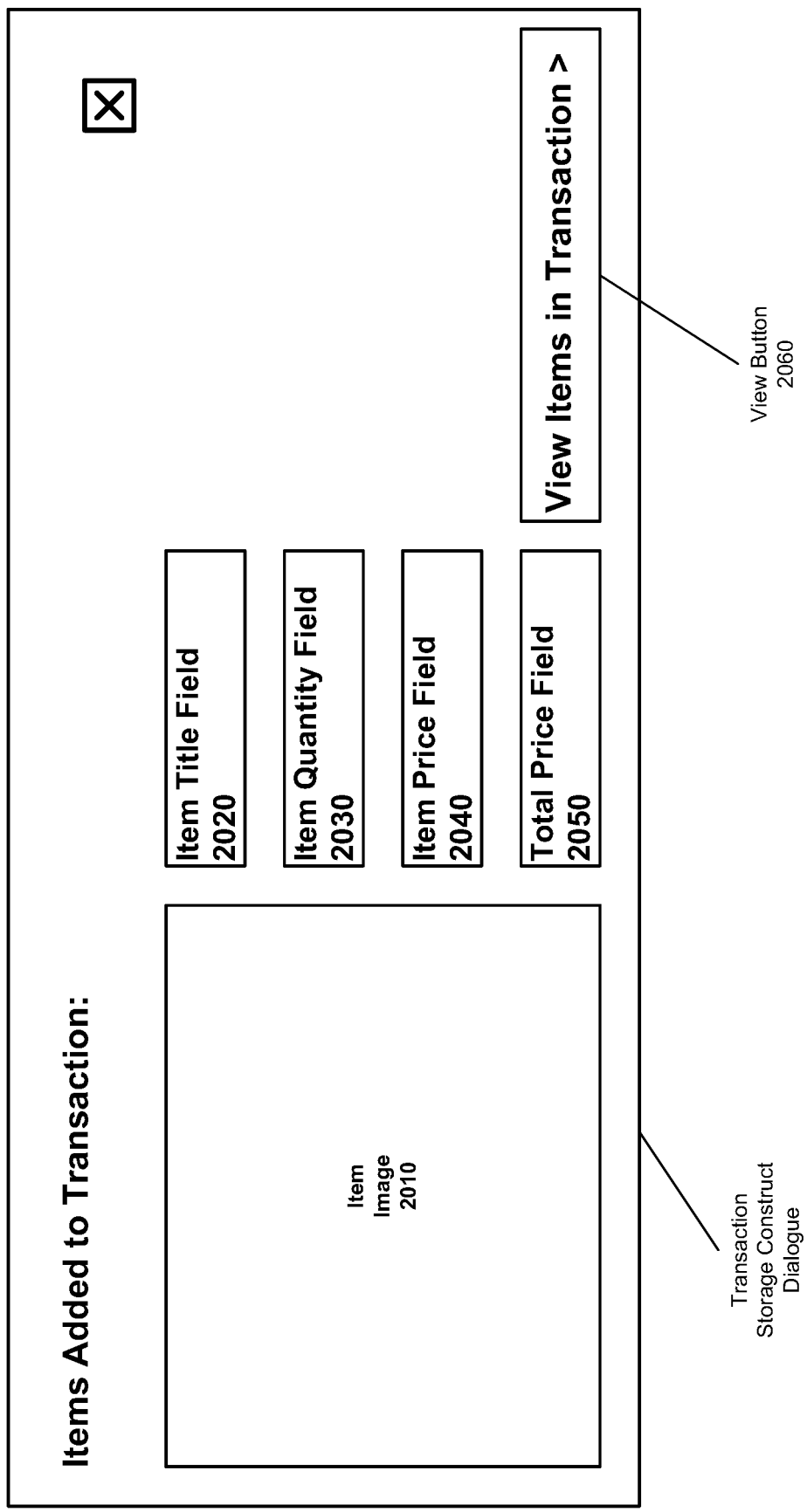
FIG. 20 is a simplified diagram illustrating an example of a user interface dialogue depicting a dialogue reflecting the completion of a given transaction, according to methods and systems such as those disclosed herein.

FIG. 20 is a simplified diagram illustrating an example of a user interface dialogue depicting a dialogue reflecting the completion of a given transaction (e.g., as by a user indicating that a transaction involving one or more items stored in a transaction storage construct, in the manner of transaction storage construct dialogue 1900 of FIG. 19, is to be given effect), according to methods and systems such as those disclosed herein. That being the case, FIG. 20 depicts a transaction dialogue 2000. Transaction dialogue 2000 can be presented to a user in the aforementioned user interface as part of, for example, completing a transaction involving the one or more items stored in the transaction storage construct in question. A dialogue such as transaction dialogue 2000 may be presented, for example, as part of a client computer's interaction with a search web server such as search web server 630 and database server 660/database 670, in performing operations such as those depicted in FIG. 7 (and more specifically, as operations 780 and 790). That being the case, and in harmony with such foregoing architectural and flow diagrams, transaction dialogue 2000 can present information regarding one or more items included in the transaction in question. Such information can include information regarding the item in question, such as an image of an item displayed in an item image field 2010, an item title displayed in an item title field 2020, the quantity of the given item displayed in an item quantity field 2030, the price of the given item displayed in an item price field 2040, and a total price displayed in a total price field 2050. Further, transaction dialogue 2000 can include a view button 2060, in order to allow the user to view the one or more items that are presently the subject of the transaction in question.

An Example Computing and Network Environment

As shown above, the systems described herein can be implemented using a variety of computer systems and networks. Examples of such computing and network environments are described below with reference to FIGS. 21 and 22.

Figure 21:
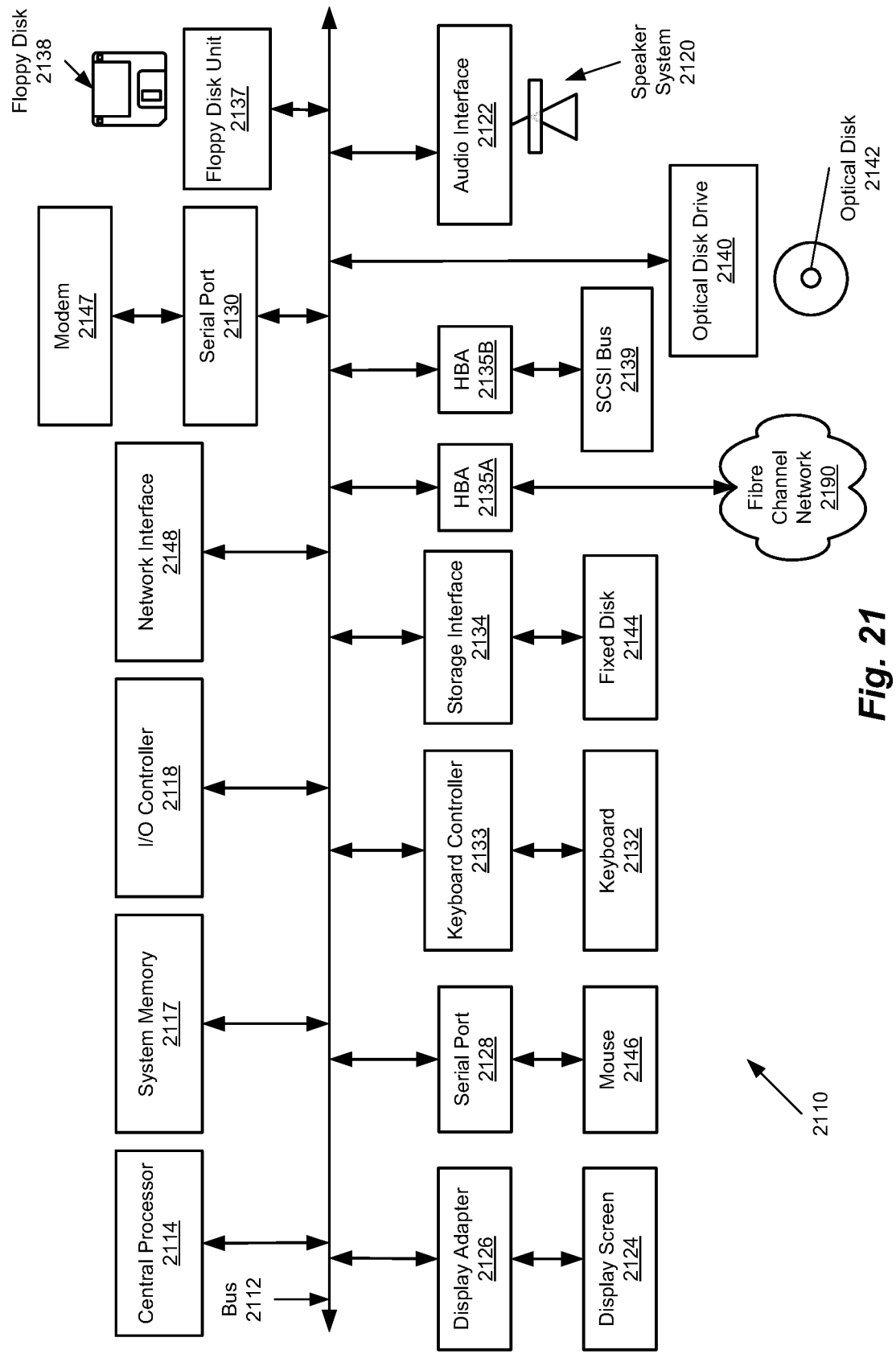
FIG. 21 is a block diagram depicting a computer system suitable for implementing aspects of systems according to embodiments of systems such as those disclosed herein.

FIG. 21 depicts a block diagram of a computer system 2110 suitable for implementing aspects of the systems described herein, and the like. Computer system 2110 includes a bus 2112 which interconnects major subsystems of computer system 2110, such as a central processor 2114, a system memory 2117 (typically RAM, but which may also include ROM, flash RAM, or the like), an input/output controller 2118, an external audio device, such as a speaker system 2120 via an audio output interface 2122, an external device, such as a display screen 2124 via display adapter 2126, serial ports 2128 and 2130, a keyboard 2132 (interfaced with a keyboard controller 2133), a storage interface 2134, a floppy disk drive 2137 operative to receive a floppy disk 2138, a host bus adapter (HBA) interface card 2135A operative to connect with a Fibre Channel network 2190, a host bus adapter (HBA) interface card 2135B operative to connect to a SCSI bus 2139, and an optical disk drive 2140 operative to receive an optical disk 2142. Also included are a mouse 2146 (or other point-and-click device, coupled to bus 2112 via serial port 2128), a modem 2147 (coupled to bus 2112 via serial port 2130), and a network interface 2148 (coupled directly to bus 2112).

Bus 2112 allows data communication between central processor 2114 and system memory 2117, which may include read-only memory (ROM) or flash memory (neither shown), and random access memory (RAM) (not shown), as previously noted. RAM is generally the main memory into which the operating system and application programs are loaded. The ROM or flash memory can contain, among other code, the Basic Input-Output System (BIOS) that controls basic hardware operation such as the interaction with peripheral components. Applications resident with computer system 2110 are generally stored on and accessed from a computer-readable storage medium, such as a hard disk drive (e.g., fixed disk 2144), an optical drive (e.g., optical drive 2140), a floppy disk unit 2137, or other computer-readable storage medium.

Storage interface 2134, as with the other storage interfaces of computer system 2110, can connect to a standard computer-readable medium for storage and/or retrieval of information, such as a fixed disk drive 2144. Fixed disk drive 2144 may be a part of computer system 2110 or may be separate and accessed through other interface systems. Modem 2147 may provide a direct connection to a remote server via a telephone link or to the Internet via an internet service provider (ISP). Network interface 2148 may provide a direct connection to a remote server via a direct network link to the Internet via a POP (point of presence). Network interface 2148 may provide such connection using wireless techniques, including digital cellular telephone connection, Cellular Digital Packet Data (CDPD) connection, digital satellite data connection or the like.

Many other devices or subsystems (not shown) may be connected in a similar manner (e.g., document scanners, digital cameras and so on). Conversely, all of the devices shown in FIG. 21 need not be present to practice the systems described herein. The devices and subsystems can be interconnected in different ways from that shown in FIG. 21. The operation of a computer system such as that shown in FIG. 21 is readily known in the art and is not discussed in detail in this application. Code to implement the modules of the systems described herein can be stored in computer-readable storage media such as one or more of system memory 2117, fixed disk 2144, optical disk 2142, or floppy disk 2138. The operating system provided on computer system 2110 may be MS-WINDOWS®, UNIX®, Linux®, or other operating system.

Further, and as will be appreciated in light of the present disclosure, each of the operations described herein may be executed by a module (e.g., a software module) or a portion of a module, or a computer system user. Thus, the above-described method, the operations thereof and modules therefor may be executed on a computer system configured to execute the operations of the method and/or may be executed from computer-readable storage media. The method may be embodied in a machine-readable and/or computer-readable storage medium for configuring a computer system to execute the method. Thus, the software modules may be stored within and/or transmitted to a computer system memory to configure the computer system to perform the functions of the module.

The software modules described herein may be received by a computer system, for example, from computer-readable storage media. Such computer readable storage media may be permanently, removably or remotely coupled to the computer system. Computer-readable storage media may non-exclusively include, for example, any number of the following: magnetic storage media (including disk and tape storage media); optical storage media such as compact disk media (e.g., CD ROM, CD R, etc.) and digital video disk storage media; nonvolatile memory storage memory including semiconductor-based memory units such as FLASH memory, EEPROM, EPROM, ROM or application specific integrated circuits; and volatile storage media (including registers, buffers or caches, main memory, RAM, etc.). In a UNIX-based embodiment, the software modules may be embodied in a file, which may be a device, a terminal, a local or remote file, a socket, or other such element. Other new and various types of computer-readable storage media may also be used to store the software modules discussed herein.

Many other devices or subsystems (not shown) may be connected in a similar manner (e.g., bar code readers, document scanners, digital cameras and so on). Conversely, it is not necessary for all of the devices shown in FIG. 21 to be present to practice the present invention. The devices and subsystems may be interconnected in different ways from that shown in FIG. 21. The operation of a computer system such as that shown in FIG. 21 is readily known in the art and is not discussed in detail in this application. Code to implement the present invention may be stored in computer-readable storage media such as one or more of system memory 2116, fixed disk 2144, CD-ROM 2142, or floppy disk 2138. Additionally, computer system 2110 may be any kind of computing device, and so includes personal data assistants (PDAs), network appliance, X-window terminal or other such computing device. Computer system 2110 also supports a number of Internet access tools, including, for example, an HTTP-compliant web browser having a JavaScript interpreter, such as Netscape Navigator®, Microsoft Internet Explorer® and the like.

Moreover, regarding the signals described herein, those skilled in the art will recognize that a signal may be directly transmitted from a first block to a second block, or a signal may be modified (e.g., amplified, attenuated, delayed, latched, buffered, inverted, filtered or otherwise modified) between the blocks. Although the signals of the above described embodiment are characterized as transmitted from one block to the next, other embodiments of the present invention may include modified signals in place of such directly transmitted signals as long as the informational and/or functional aspect of the signal is transmitted between blocks. To some extent, a signal input at a second block may be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

Figure 22:
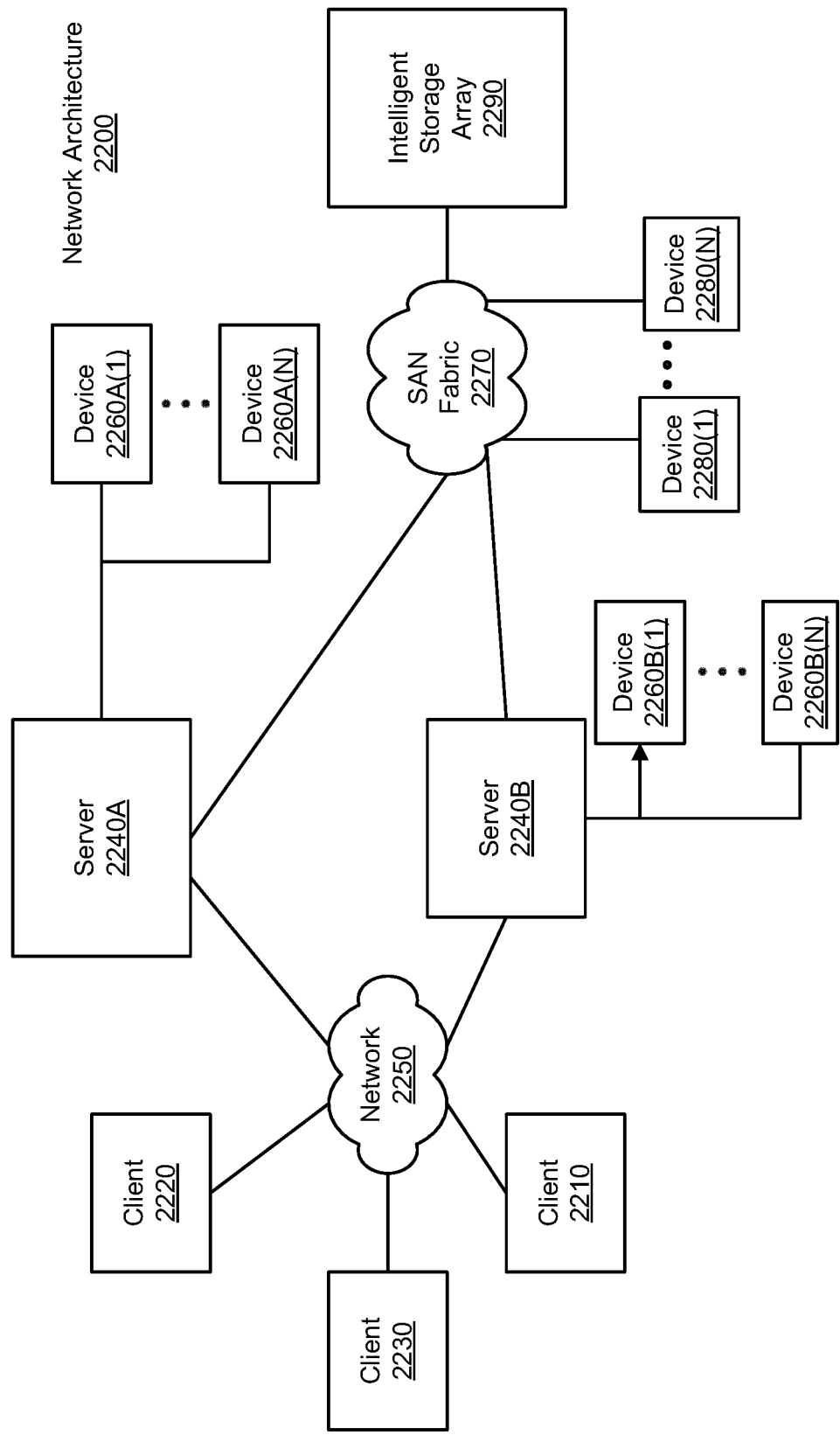
FIG. 22 is a block diagram depicting a network architecture suitable for implementing aspects of systems according to embodiments of systems such as those disclosed herein.

FIG. 22 is a block diagram depicting a network architecture 2200 in which client systems 2210, 2220 and 2230, as well as storage servers 2240A and 2240B (any of which can be implemented using computer system 2210), are coupled to a network 2250. Storage server 2240A is further depicted as having storage devices 2260A(1)-(N) directly attached, and storage server 2240B is depicted with storage devices 2260B(1)-(N) directly attached. Storage servers 2240A and 2240B are also connected to a SAN fabric 2270, although connection to a storage area network is not required for operation. SAN fabric 2270 supports access to storage devices 2280(1)-(N) by storage servers 2240A and 2240B, and so by client systems 2210, 2220 and 2230 via network 2250. Intelligent storage array 2290 is also shown as an example of a specific storage device accessible via SAN fabric 2270.

With reference to computer system 2110, modem 2147, network interface 2148 or some other method can be used to provide connectivity from each of client computer systems 2210, 2220 and 2230 to network 2250. Client systems 2210, 2220 and 2230 are able to access information on storage server 2240A or 2240B using, for example, a web browser or other client software (not shown). Such a client allows client systems 2210, 2220 and 2230 to access data hosted by storage server 2240A or 2240B or one of storage devices 2260A(1)-(N), 2260B(1)-(N), 2280(1)-(N) or intelligent storage array 2290. FIG. 18 depicts the use of a network such as the Internet for exchanging data, but the systems described herein are not limited to the Internet or any particular network-based environment.

The foregoing described embodiments wherein the different components are contained within different other components (e.g., the various elements shown as components of computer system 2110, discussed subsequently). It is to be understood that such depicted architectures are merely examples, and that in fact many other architectures can be implemented which achieve the same functionality. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermediate components. Likewise, any two components so associated can also be viewed as being "operably connected", or "operably coupled", to each other to achieve the desired functionality.

Other Embodiments

The systems described herein are well adapted to attain the advantages mentioned as well as others inherent therein.

While such systems have been depicted, described, and are defined by reference to particular descriptions, such references do not imply a limitation on the claims, and no such limitation is to be inferred. The systems described herein are capable of considerable modification, alteration, and equivalents in form and function, as will occur to those ordinarily skilled in the pertinent arts in considering the present disclosure. The depicted and described embodiments are examples only, and are in no way exhaustive of the scope of the claims.

The foregoing detailed description has set forth various embodiments of the systems described herein via the use of block diagrams, flowcharts, and examples. It will be understood by those within the art that each block diagram component, flowchart step, operation and/or component illustrated by the use of examples can be implemented (individually and/or collectively) by a wide range of hardware, software, firmware, or any combination thereof.

The systems described herein have been described in the context of fully functional computer systems; however, those skilled in the art will appreciate that the systems described herein are capable of being distributed as a program product in a variety of forms, and that the systems described herein apply equally regardless of the particular type of computer-readable media used to actually carry out the distribution. Examples of computer-readable media include computer-readable storage media, as well as media storage and distribution systems developed in the future.

The above-discussed embodiments can be implemented by software modules that perform one or more tasks associated with the embodiments. The software modules discussed herein may include script, batch, or other executable files. The software modules may be stored on a machine-readable or computer-readable storage media such as magnetic floppy disks, hard disks, semiconductor memory (e.g., RAM, ROM, and flash-type media), optical discs (e.g., CD-ROMs, CD-Rs, and DVDs), or other types of memory modules. A storage device used for storing firmware or hardware modules in accordance with an embodiment can also include a semiconductor-based memory, which may be permanently, removably or remotely coupled to a microprocessor/memory system. Thus, the modules can be stored within a computer system memory to configure the computer system to perform the functions of the module. Other new and various types of computer-readable storage media may be used to store the modules discussed herein.

The above description is intended to be illustrative and should not be taken to be limiting. As will be appreciated in light of the present disclosure, other embodiments are possible. Those skilled in the art will readily implement the steps necessary to provide the structures and the methods disclosed herein, and will understand that the process parameters and sequence of steps are given by way of example only and can be varied to achieve the desired structure as well as modifications that are within the scope of the claims. Variations and modifications of the embodiments disclosed herein can be made based on the description set forth herein, without departing from the scope of the claims, giving full cognizance to equivalents thereto in all respects.

Although the systems described herein have been described in connection with several embodiments, these embodiments and their descriptions are not intended to be limited to the specific forms set forth herein. On the contrary, it is intended that such embodiments address such alternatives, modifications, and equivalents as can be reasonably included within the scope of the appended claims.

What is claimed is:

1. A computer-implemented method, implemented in a computer system, comprising:
    receiving a first communication at a web server implemented by the computer system, wherein
        the web server is configured to implement a website that presents a search field in a user interface displayed as a web page of the website by a remote computer system, and
        the first communication is received as a result of an event in the search field;
    in response to receipt of the first communication,
        performing a search operation, wherein
            the performing the search operation causes a search query to be performed on a database communicatively coupled to the web server,
            at least one other web page of the website provides access to information in the database,
            the performing the search operation produces a search result, and
            the search result comprises item information corresponding to an item, and
        determining additional information regarding the item by causing the web server to access one or more application programming interfaces;
    sending a second communication from the web server, wherein
        the second communication communicates the search result and the additional information to the remote computer system, and
        the second communication is configured to cause presentation of the search result and the additional information in the user interface;
    receiving a third communication at the web server, wherein
        the third communication represents a selection of the item in the user interface, and
        the third communication comprises at least a portion of the item information; and
    in response to receipt of the third communication, storing the at least the portion of the item information in a transaction storage construct of the website.

2. The method of claim 1, wherein
    the search field is configured to facilitate the search operation by virtue of being configured to receive a search term.

3. The method of claim 1, further comprising:
    sending a fourth communication from the computer system, wherein
        the fourth communication is configured to cause presentation of one or more sub-categories responsive to information comprised in the first communication, in the user interface; and
    receiving a fifth communication at the computer system, wherein
        the fifth communication represents an event indicating one of the one or more sub-categories.

4. The method of claim 3, wherein
    the sending the fourth communication from the computer system is performed in response to receipt of the fifth communication.

5. The method of claim 3, wherein
    the user interface is configured to present the search result in an entry in a drop-down menu, and
    the entry comprises an add item button.

6. The method of claim 5, wherein
selection of the add item button causes the remote computer system to send the fourth communication.

7. The method of claim 1, wherein
the item is at least one of
a product,
a service, or
a product-service system.

8. The method of claim 7, wherein
the item information comprises at least one of
a visual representation of the item,
a description of the item, or
an item quantity, and
the visual representation is at least one of
an image of a product, or
an image representative of a service.

9. The method of claim 1, wherein the determining the additional information further comprises:
determining an inventory quantity of the item by accessing an inventory application programming interface; and
determining a price of the item by accessing a price application programming interface.

10. A computer program product comprising:
a nontransitory computer-readable storage medium; and
a plurality of instructions, encoded in the nontransitory computer-readable storage medium and configured to implement a web server that is configured to implement a website,
wherein the plurality of instructions comprises
a first set of instructions, executable by a processor of a computer system, configured to receive a first communication at the web server, wherein
the computer system comprises a network interface configured to facilitate communications between the computer system and a remote computer system,
the first communication is received via the network interface,
the plurality of instructions are configured to cause presentation of a search field in a user interface displayed as a web page of the website by the remote computer system, and
the first communication is received as a result of an event in the search field,
a second set of instructions, executable by the processor of the computer system, configured to, in response to receipt of the first communication,
perform a search operation, wherein
the second set of instructions configured to perform the search operation are configured to cause a search query to be performed on a database communicatively coupled to the web server and produce a search result,
at least one other web page of the website provides access to information in the database, and
the search result comprises item information corresponding to an item, and
determine additional information regarding the item by causing the web server to access one or more application programming interfaces,
a third set of instructions, executable by the processor of the computer system, configured to send a second communication from the web server, wherein
the second communication is sent via the network interface,
the second communication communicates the search result and the additional information to the remote computer system, and
the second communication is configured to cause presentation of the search result and the additional information in the user interface,
a fourth set of instructions, executable by the processor of the computer system, configured to receive a third communication at the web server, wherein
the third communication is received via the network interface,
the third communication represents a selection of the item in the user interface, and
the third communication comprises at least a portion of the item information, and
a fifth set of instructions, executable by the processor of the computer system, configured to, in response to receipt of the third communication, store the at least the portion of the item information in a transaction storage construct of the website.

11. The computer program product of claim 10, wherein the instructions further comprise:
a sixth set of instructions, executable by the processor of the computer system, configured to send a fourth communication to the remote computer system, wherein
the fourth communication is configured to cause presentation of one or more sub-categories responsive to information comprised in the first communication, in the user interface; and
a seventh set of instructions, executable by the processor of the computer system, configured to receive a fifth communication at the computer system, wherein
the fifth communication represents an event indicating one of the one or more sub-categories.

12. The computer program product of claim 11, wherein
the user interface is configured to present the search result in an entry in a drop-down menu,
the entry comprises an add item button, and
selection of the add item button causes the remote computer system to send the fourth communication.

13. The computer program product of claim 10, wherein
the item is at least one of
a product,
a service, or
a product-service system.

14. The computer program product of claim 13, wherein
the item information comprises at least one of
a visual representation of the item,
a description of the item, or
an item quantity, and
the visual representation is at least one of
an image of a product, or
an image representative of a service.

15. The computer program product of claim 10, wherein the second set of instructions comprises:
a first subset of instructions, executable by the processor of the computer system, configured to determine an inventory quantity of the item by accessing an inventory application programming interface; and
a second subset of instructions, executable by the processor of the computer system, configured to determine a price of the item by accessing a price application programming interface.

16. A computer system comprising:
one or more processors, wherein
- the computer system is configured to be coupled to a product/search server database and a distributed database system;

a nontransitory computer-readable storage medium coupled to the one or more processors; and a plurality of instructions, encoded in the nontransitory computer-readable storage medium and configured to implement a website by virtue of being configured to cause the one or more processors to
- receive a first communication at a web server implemented by the computer system, wherein
  - the plurality of instructions are configured to cause presentation of a search field in a user interface displayed as a web page of the website by a remote computer system, and
  - the first communication is received as a result of an event in the search field,
- in response to receipt of the first communication,
  - perform a search operation on the product/search server database, wherein
    - the instructions configured to cause the one or more processors to perform the search operation are further configured to
      - cause a search query to be performed on a database communicatively coupled to the web server, and
      - produce a search result,
    - at least one other web page of the website provides access to information in the database, and
    - the search result comprises item information corresponding to an item, and
  - determine additional information regarding the item by causing the web server to access one or more application programming interfaces,
- send a second communication from the web server, wherein
  - the second communication communicates the search result and the additional information to the remote computer system, and
  - the second communication is configured to cause presentation of the search result and the additional information in the user interface,
- receive a third communication at the web server, wherein
  - the third communication represents a selection of the item in the user interface, and
  - the third communication comprises at least a portion of the item information, and
- in response to receipt of the third communication, store the at least the portion of the item information in a transaction storage construct in the distributed database system.

17. The computer system of claim 16, wherein the plurality of instructions is further configured to cause the one or more processors to:
- send a fourth communication to the remote computer system, wherein
  - the fourth communication is configured to cause presentation of one or more sub-categories responsive to information comprised in the first communication, in the user interface; and
- receive a fifth communication at the computer system, wherein
  - the fifth communication represents an event indicating one of the one or more sub-categories, and
  - the one or more sub-categories are determined by searching the product/search server database.

18. The computer system of claim 17, wherein
the user interface is configured to present the search result in an entry in a drop-down menu,
the entry comprises an add item button, and
selection of the add item button facilitates the remote computer system sending the fourth communication.

19. The computer system of claim 16, wherein
the item is at least one of
- a product,
- a service, or
- a product-service system, the item information comprises at least one of
- a visual representation of the item,
- a description of the item, or
- an item quantity, and the visual representation is at least one of
- an image of a product, or
- an image representative of a service.

20. The computer system of claim 16, wherein the plurality of instructions configured to cause the one or more processors to determine the additional information are configured to cause the one or more processors to:
- determine an inventory quantity of the item by accessing an inventory application programming interface of the product/search server database; and
- determine a price of the item by accessing a price application programming interface of the product/search server database.

* * * * *